(12) United States Patent
Penfield et al.

(10) Patent No.: US 12,277,790 B1
(45) Date of Patent: *Apr. 15, 2025

(54) AUTOMATED INDUSTRIAL HYGIENE ASSESSMENT AND DISPLAY

(71) Applicant: VelocityEHS Holdings Inc., Chicago, IL (US)

(72) Inventors: Julia Penfield, Seattle, WA (US); Aatish Suman, Chicago, IL (US); Sami Navneeth, Oakville (CA); Kristi Hames, Westerville, OH (US); Lee Boulineau, Tampa, FL (US); David Scott Risi, Chantilly, VA (US)

(73) Assignee: VelocityEHS Holdings Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/990,865

(22) Filed: Dec. 20, 2024

Related U.S. Application Data

(63) Continuation of application No. 18/432,982, filed on Feb. 5, 2024, which is a continuation-in-part of
(Continued)

(51) Int. Cl.
| | |
|---|---|
| *G06F 40/205* | (2020.01) |
| *G06F 16/31* | (2019.01) |
| *G06F 40/258* | (2020.01) |
| *G06F 40/284* | (2020.01) |
| *G06F 40/295* | (2020.01) |

(Continued)

(52) U.S. Cl.
CPC ........ *G06V 30/2528* (2022.01); *G06F 16/316* (2019.01); *G06F 40/205* (2020.01); *G06F 40/258* (2020.01); *G06F 40/284* (2020.01); *G06F 40/295* (2020.01); *G06F 40/40* (2020.01); *G06V 10/82* (2022.01); *G06V 30/19147* (2022.01); *G06V 30/413* (2022.01); *G06V 30/416* (2022.01)

(58) Field of Classification Search
CPC ............... G06V 30/2528; G06V 10/82; G06V 30/19147; G06V 30/413; G06V 30/416; G06F 16/316; G06F 40/205; G06F 40/258; G06F 40/284; G06F 40/295; G06F 40/40
USPC ...................................................... 382/156
See application file for complete search history.

(56) References Cited

U.S. PATENT DOCUMENTS

| | | |
|---|---|---|
| 11,324,439 B2 | 5/2022 | Diaz-Arias et al. |
| 11,482,048 B1 | 10/2022 | Diaz-Arias et al. |

(Continued)

*Primary Examiner* — Charlotte M Baker
(74) *Attorney, Agent, or Firm* — K&L Gates LLP

(57) ABSTRACT

Systems and methods are disclosed for automated industrial hygiene assessment and display comprising receiving sampling results for a stressor, such as a harmful environmental artifact in a physical environment; deriving one or more codes for the stressor from a digital record via an indexing module and/or from other data sources; generating a health effect rating (HER) based on the code; generating an exposure rating (ER) based on the sampling results; generating an uncertainty rating (UR) based on the sampling results; displaying, an interactive UI to facilitate approval or selection of at least one of the HER, the ER, or the UR; generating at least one of a risk rating (RR) or an information gathering priority rating (IGPR) based on a selection of the at least one of the HER, the ER, or the UR; and displaying via the interactive UI at least one of the RR or the IGPR.

21 Claims, 27 Drawing Sheets

Related U.S. Application Data application No. 18/212,533, filed on Jun. 21, 2023, now Pat. No. 11,893,047, which is a continuation of application No. 18/098,055, filed on Jan. 17, 2023, now Pat. No. 11,727,702.

(51) Int. Cl.
*G06F 40/40* (2020.01)
*G06V 10/82* (2022.01)
*G06V 30/19* (2022.01)
*G06V 30/24* (2022.01)
*G06V 30/413* (2022.01)
*G06V 30/416* (2022.01)

(56) References Cited

U.S. PATENT DOCUMENTS

| | | | |
|---|---|---|---|
| 2010/0092095 | A1 | 4/2010 | King et al. |
| 2020/0286045 | A1* | 9/2020 | Ripley .................. G06F 16/906 |
| 2021/0313830 | A1* | 10/2021 | Dowler .................. H02J 1/084 |
| 2022/0079510 | A1 | 3/2022 | Robillard et al. |
| 2022/0197958 | A1 | 6/2022 | Volynets et al. |
| 2022/0386942 | A1 | 12/2022 | Diaz-Arias et al. |

\* cited by examiner

| | | | | | | | |
|---|---|---|---|---|---|---|---|
| | INFERENCE TEXT PRODUCTNAME | INFERENCE TEXT MANUFACTURERNAME | INFERENCE TEXT SUPPLIERNAME | INFERENCE TEXT ALIAS | INFERENCE TEXT CAS | INFERENCE TEXT REVISIONDATE | INFERENCE TEXT LANGUAGE |
| INPUT | EXAMPLE 2 | GMO FREE CO | ACME CO. | | | 02/2018 | ENGLISH |

905

| | | | | | | | |
|---|---|---|---|---|---|---|---|
| | INFERENCE TEXT PRODUCTNAME | INFERENCE TEXT MANUFACTURERNAME | INFERENCE TEXT SUPPLIERNAME | INFERENCE TEXT ALIAS | INFERENCE TEXT CAS | INFERENCE TEXT REVISIONDATE | INFERENCE TEXT LANGUAGE |
| OUTPUT | GMO FREE CO | ACME CO. | | | | 02/2018 | ENGLISH |

| Industrial Hygiene | | | | | | | | | | ⚙ ▦ Dayton Manufacturing▾ Help |
|---|---|---|---|---|---|---|---|---|---|---|
| SEGs  Qualitative Assessment  Sampling Plan  Medical Surveillance  Survey  Samples  Lab Submissions  IH Equipment  Fit Test  Reports | | | | | | | | | | DR |

Qualitative Assessment

FILTER

🔍 Search  *1504*  ▾Filter  ⎙Print  ⧉Copy  +Add New [11/11]

Departments: ___

Display SEG Matrix   [Search...]

| Delete? | Department | Job | Task | Assoc. Equipment | Stressor | Risk Band | Risk Rating | Uncertainty Rating | Info Gather Priority Rating | Last Assmnt | Next Assmnt |
|---|---|---|---|---|---|---|---|---|---|---|---|
| ⊗ | Automotive Paint | Painter | Painting-Spray | Paint Booth 22A | Toluene | ▨ | 6 | 1 | 6 | 31-Jul-2019 | 31-Jul-2021 |
| ⊗ | Automotive Paint | Painter | Painting-Spray | Paint Booth 35B | Methylene chloride | ▨ | 6 | 1 | 6 | 20-May-2021 | 20-May-2021 |
| ⊗ | Automotive Paint | Painter | Painting-Spray | Paint Booth 35B | Noise (ACGIH TLV) | ▨ | 9 | 0 | 0 | 20-May-2021 | 20-May-2021 |
| ⊗ | Automotive Paint | Painter | Painting-Spray | Paint Booth 35B | Toluene |  | 2 | 2 | 12 | 20-May-2021 | 20-May-2021 |
| ⊗ | Fabrication/Weld shop | Millwright | Welding-Galvanized |  | Zinc Oxide | ▨ | 6 | 1 | 3 | 31-Jul-2019 | 31-Jul-2021 |
| ⊗ | Final Assembly | Assembly-Worker | Routine Duties |  | Noise | ▨ | 3 | 0 | 0 | 31-Jul-2019 | 31-Jul-2021 |
| ⊗ | Machine Assembly-Line 1 | Assembly-Worker | Routine Duties |  | Noise (OSHA PEL) |  | 12 | 0 | 0 | 31-Jul-2019 | 31-Jul-2021 |
| ⊗ | Machine Assembly-Line 1 | Assembly-Worker | Routine Duties |  | Noise (OSHA PEL) |  | 1 | 0 | 0 |  |  |
| ⊗ | Machine Assembly-Line 1 | Assembly-Worker | Routine Duties |  | Oil mist | ▨ | 9 | 1 | 9 | 31-Aug-2019 | 31-Aug-2021 |
| ⊗ | Machine Assembly-Line 2 | Assembly-Worker | Routine Duties |  | Noise |  |  |  |  | 31-Jul-2019 | 31-Jul-2021 |

*1500*  *1501*  *1503*

Jobs: ___
Tasks: ___
Associated Equipment: ___
Stressors: ___
Next Assessment Due: ___
Status: Active ▾
Risk Band: ☐ ▨ ☐ ▨ ☐ ▨

AUTOMATED INDUSTRIAL HYGIENE ASSESSMENT AND DISPLAY

CROSS-REFERENCES TO RELATED APPLICATIONS

This application is a continuation of U.S. application Ser. No. 18/432,982, filed Feb. 5, 2024, entitled "AUTOMATED INDUSTRIAL HYGIENE ASSESSMENT AND DISPLAY", which is a continuation-in-part of U.S. application Ser. No. 18/212,533, filed Jun. 21, 2023, entitled "AUTOMATED INDEXING AND EXTRACTION OF INFORMATION IN DIGITAL RECORDS", now U.S. Pat. No. 11,893,047, issued Feb. 6, 2024, which is a continuation of U.S. application Ser. No. 18/098,055, filed Jan. 17, 2023, entitled "AUTOMATED INDEXING AND EXTRACTION OF INFORMATION IN DIGITAL DOCUMENTS", now U.S. Pat. No. 11,727,702, issued Aug. 15, 2023, all of which are hereby incorporated by reference in their entireties.

TECHNICAL FIELD

Disclosed are automated systems and methods configured to assess, index, and display information from digital documents and other data sources in an interactive user interface, and, which in various instances rely on trained machine learning networks individually to index chemical information and provide automated assessments, suggestions and solutions. In particular, this application is directed to automated industrial hygiene assessment and display.

SUMMARY

Among other features, the present disclosure relates to a computer implemented method for automated industrial hygiene risk assessment and display. According to one embodiment, an example method may comprise receiving sampling results for a stressor in a physical environment; deriving one or more codes for the stressor from at least one of a digital record via an indexing module, chemical management application or database or a third party data source; generating a health effect rating (HER) based on the one or more codes; generating an exposure rating (ER) based on the sampling results; generating an uncertainty rating (UR) based on the sampling results; displaying via a display device, an interactive user interface to facilitate approval or selection of at least one of the HER, the ER, or the UR; generating at least one of a risk rating (RR) or an information gathering priority rating (IGPR) based on a selection of the at least one of the HER, the ER, or the UR; and displaying via the interactive user interface at least one of the RR or the IGPR.

In some embodiments, the deriving of the one or more codes via the indexing module may comprise inputting an image of a page of the digital record into a visual machine learning (ML) network, identifying by the visual ML, a section of the image that contains the targeted information, inputting a page number of the page, the digital record, and coordinates of the section into an extraction module, and extracting the one or more codes by the extraction module from the section. The visual ML may be trained to recognize, in the image, text associated with targeted information.

In yet another embodiment, the method may further comprise selecting a page number of a digital document of digital records to identify a page containing the one or more codes. The selecting may comprise at least one of: parsing the digital document to produce a string of characters; and identifying relevant portions in the string of characters containing the one or more codes.

In further embodiments, the identifying of the relevant portions may comprise splitting the string of characters into tokens, inputting the tokens into a natural language processing (NLP) ML network; and identifying by the NLP a first word of a chemical ingredient name, a subsequent word of a chemical ingredient name, or a word not belonging to any chemical ingredient name.

According to one embodiment, the identifying of the relevant portions may comprise at least one of: adding the page number to a list, based on determining a beginning part and an end part of a relevant portion are on the page, adding the page number to a list, based on determining that the beginning part but not the end part of the relevant portion is on the page, and that the targeted information is on a subsequent page, adding the page number to a list, based on determining that the end part but not the beginning part of the relevant portion is on the page, and that the targeted information is on a previous page, or adding the page number to a list, based on determining that an alphanumeric combination is present on a page.

The visual ML may be trained on a custom dataset comprising images of digital documents to output coordinates of identified tables in the digital document.

Moreover, the method may further comprise identifying the section via optical character recognition, based on the visual ML failing to identify the section; and outputting coordinates of the section of the image.

The method may further comprise generating the image of the page corresponding to the page number. In one embodiment, the risk rating may comprise the ER multiplied by the HER. The UR may include a multiplier. The IGPR may comprise the RR multiplied by the UR.

In some embodiments, the generating of the HER may comprise classifying the one or more codes within a group of a plurality of groups, wherein each group of the plurality of groups is associated with a specific HER rating, the classifying generating the HER. The classifying may be based on the one or more codes being associated with one or more chemicals.

The user interface may comprise interactive elements comprising at least one of a plurality of selectable tabs, a color coded SEG matrix, selectable menus to set the HER, ER and UR of the stressor, or selectable or clickable options to rearrange displayed information.

Further, the user interface may comprise interactivity to select at least one type of data object to customize at least one of the HER, UR, or RR, or combinations thereof associated with the at least one type of data object.

In accordance with other aspects, the present disclosure relates to an interactive interface system for display and interaction with automated industrial hygiene risk assessments, the system comprising: at least one processor; and at least one non-transitory, computer-readable memory storing instructions that, when executed by the at least one processor, are configured to: receive sampling results of a stressor in a physical environment; derive one or more codes for the stressor from at least one of a digital record via an indexing module or a third party data source; generate a HER based on the code; generate an ER based on the sampling results; generate an UR based on the sampling results; display via a display device, an interactive user interface to facilitate approval or selection of at least one of the HER, the exposure rating, or the uncertainty rating; generate at least one of a RR or an IGPR based on a selection of the at least one of the HER, the ER, or the UR; and display via the interactive user interface at least one of the RR or the IGPR.

In one embodiment, the instructions when executed by the at least one processor, may be further configured to: input an image of a page of a digital record into a visual ML network, wherein the visual ML may be trained to recognize text associated with targeted information in the image; identify by the visual ML, sections of the image that contain the targeted information; input a page number of the page, the digital record, and coordinates of the sections into an extraction module; extract the targeted information by the extraction module from the sections; input the extracted targeted information into a NLP ML network; and identify at least one data item, by the NLP, based on a structure of the extracted targeted information.

In accordance with additional aspects, the present disclosure relates to a non-transitory computer-readable storage medium, having embodied thereon a program, the program being executable by a processor to perform a method for displaying and interacting with automated industrial hygiene risk assessments comprising: receiving sampling results of a stressor in a physical environment; deriving one or more codes for the stressor from at least one of a digital record via an indexing module or a third party data source; generating a HER based on the one or more codes; generating an ER based on the sampling results; generating an UR based on the sampling results; displaying via a display device, an interactive user interface to facilitate approval or selection of at least one of the HER, the exposure rating, or the uncertainty rating; and generating at least one of a RR or an IGPR based on at least one of the HER, the ER, or the UR; and displaying via the interactive user interface at least one of the RR or the IGPR.

The user interface may comprise interactive elements including at least one of a plurality of selectable tabs, a color coded SEG matrix, selectable menus to set the HER, ER and UR of the stressor, or selectable or clickable options to rearrange displayed information.

Further, the user interface may comprise interactivity to select at least one type of data object to customize at least one of the HER, UR, or RR, or combinations thereof associated with the at least one type of data object.

In some implementations, the deriving of the one or more codes via the indexing module may comprise: inputting an image of a page of a digital record into a visual ML network, wherein the visual ML may be trained to recognize text associated with targeted information in the image; identifying by the visual ML, a section of the image that contains the targeted information; inputting a page number of the page, the digital record, and coordinates of the section into an extraction module; and extracting the one or more codes by the extraction module from the section.

In addition, the method for displaying and interacting with automated industrial hygiene risk assessments further comprises: selecting a page number of a digital document of digital records to identify a page containing the one or more codes, wherein the selecting comprises at least one of: parsing the digital document to produce a string of characters; and identifying relevant portions in the string of characters containing the one or more codes. The identifying of the relevant portions may comprise: splitting the string of characters into tokens; inputting the tokens into a NLP ML network; and identifying by the NLP a first word of a chemical ingredient name, a subsequent word of a chemical ingredient name, or a word not belonging to any chemical ingredient name.

Additionally, the method for displaying and interacting with automated industrial hygiene risk assessments further comprises: classifying the one or more codes within a group of a plurality of groups, wherein each group of the plurality of groups is associated with a specific HER rating, the classifying generating the HER, wherein the risk rating comprises the ER multiplied by the HER, wherein the classifying is based on the one or more codes being associated with one or more chemicals.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
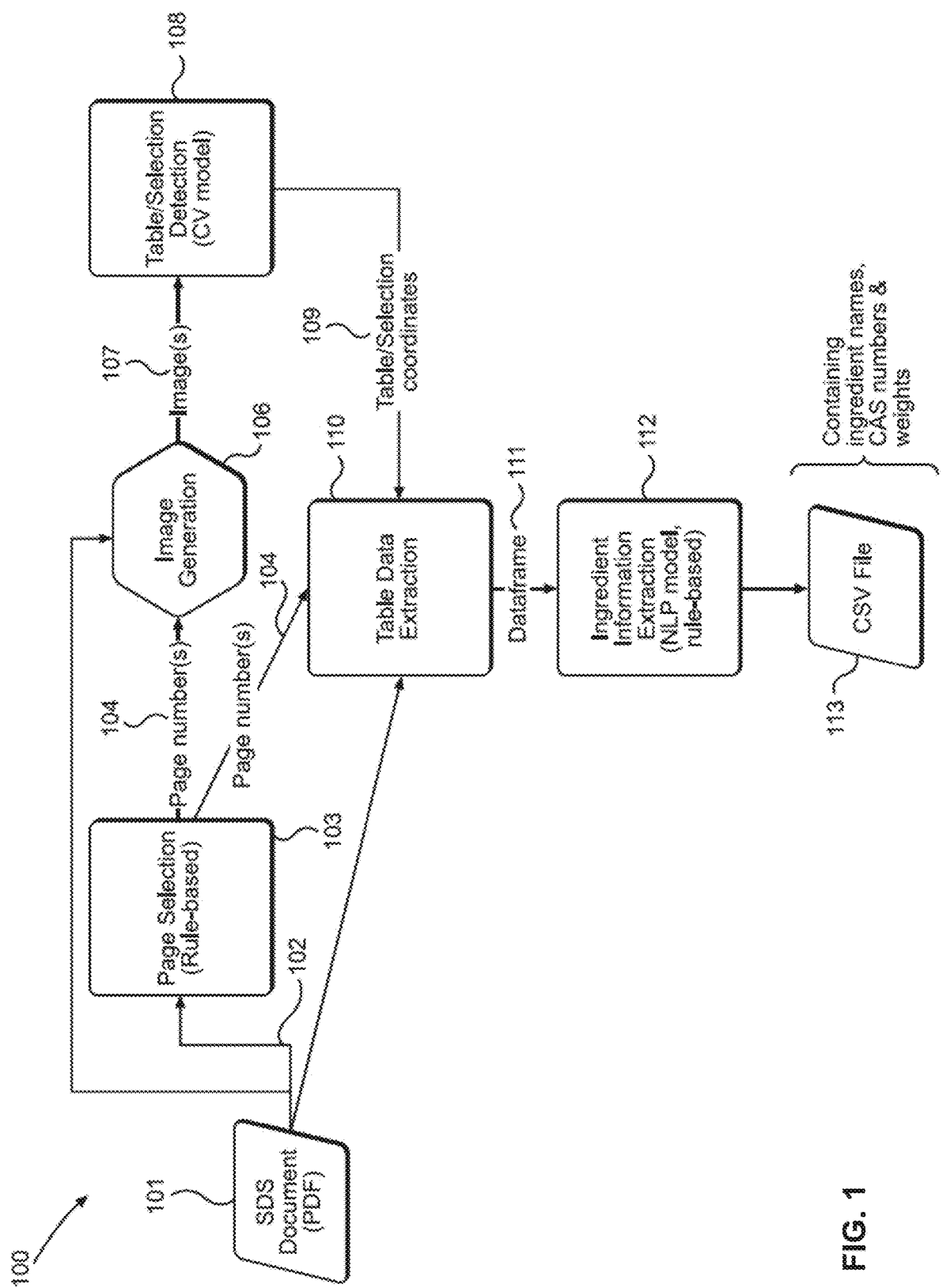

The systems, and methods disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 illustrates a flow chart of one aspect of a method to automatically index and extract specialized tabulated information in a document, according to at least one aspect of the present disclosure.

Figure 2:
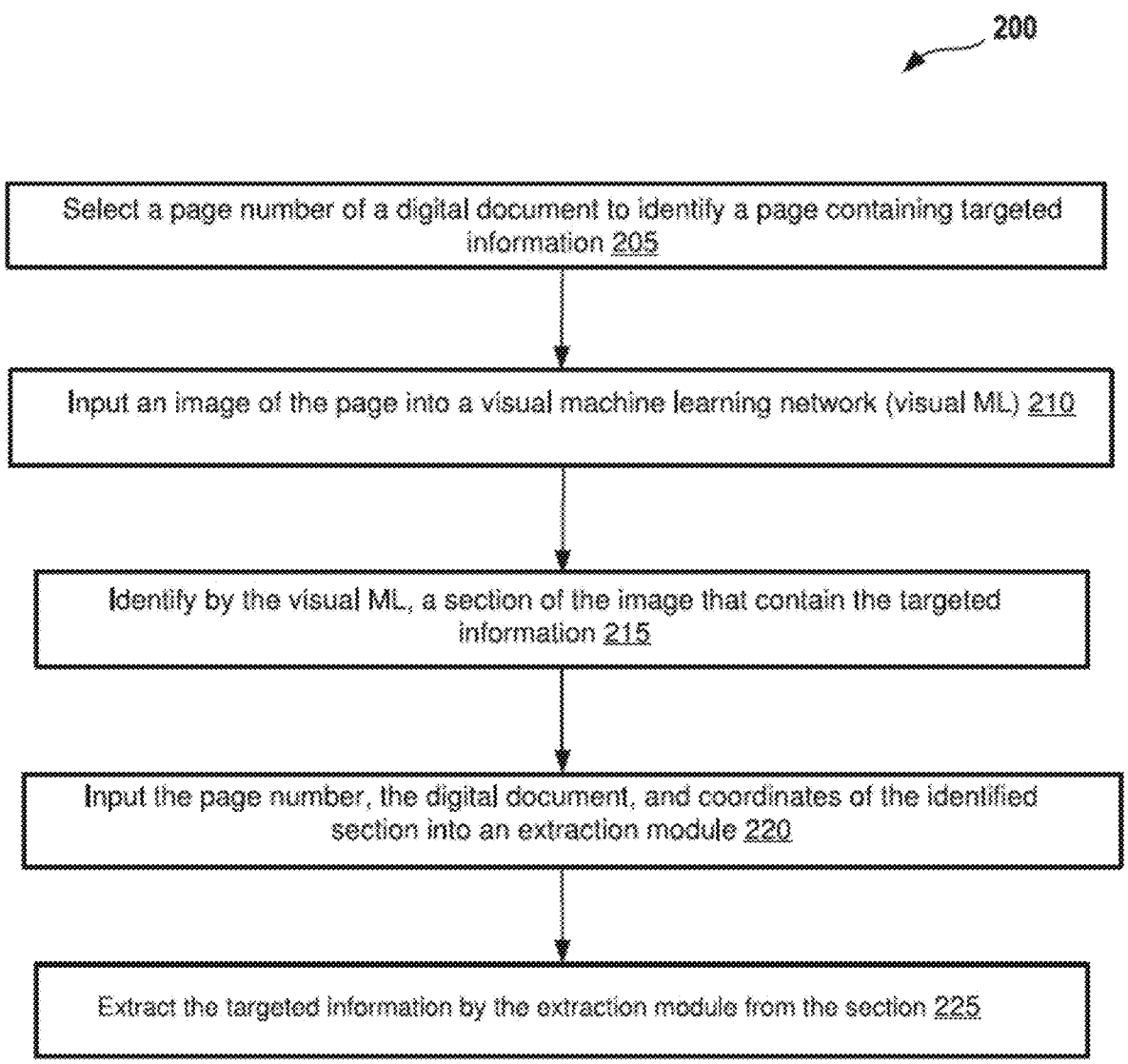

FIG. 2 illustrates a flow diagram of one aspect of a method to automatically index specialized targeted information in a digital data record, according to at least one aspect of the present disclosure.

Figure 3:
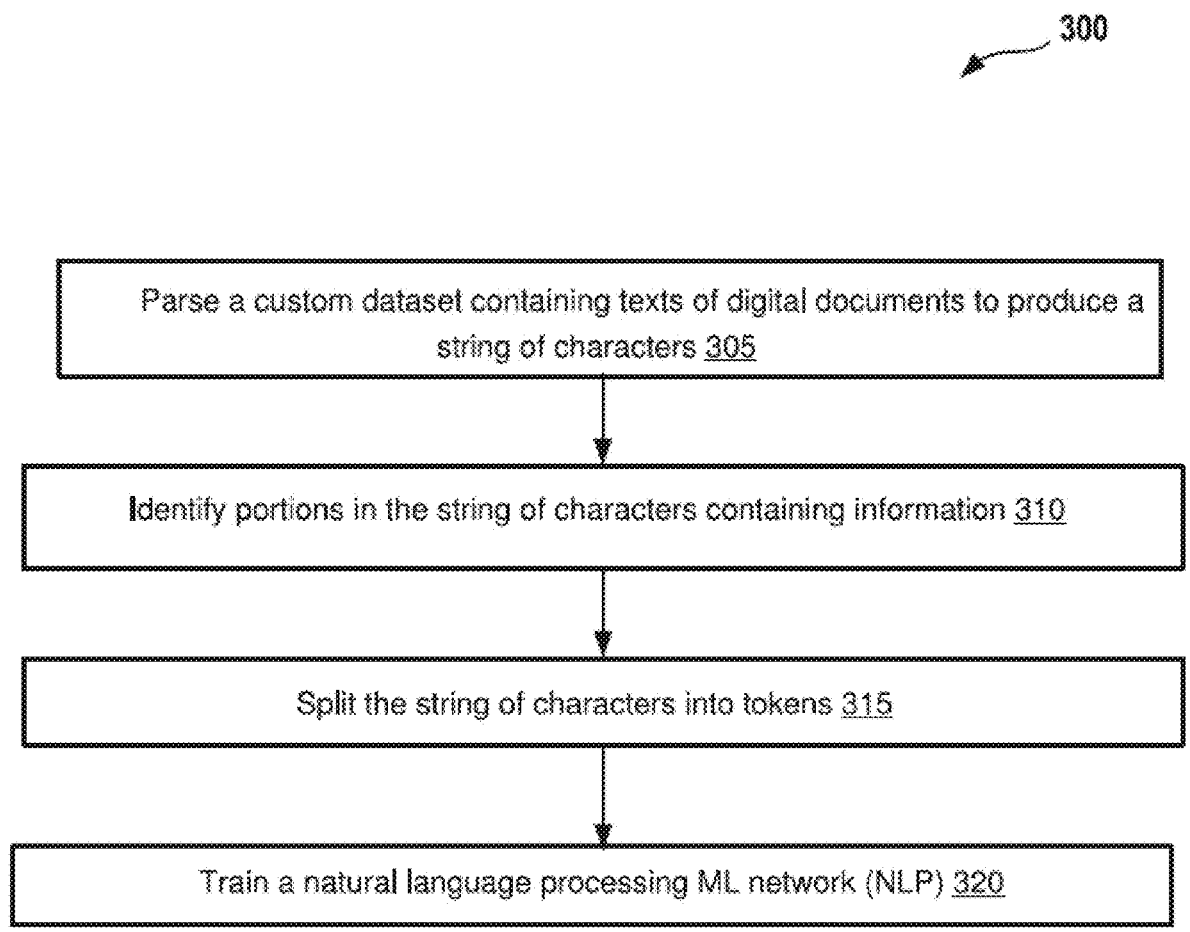

FIG. 3 illustrates a flow chart of one aspect of a method to train multiple types of machine learning networks to autonomously identify targeted information, according to at least one aspect of the present disclosure.

Figure 4:
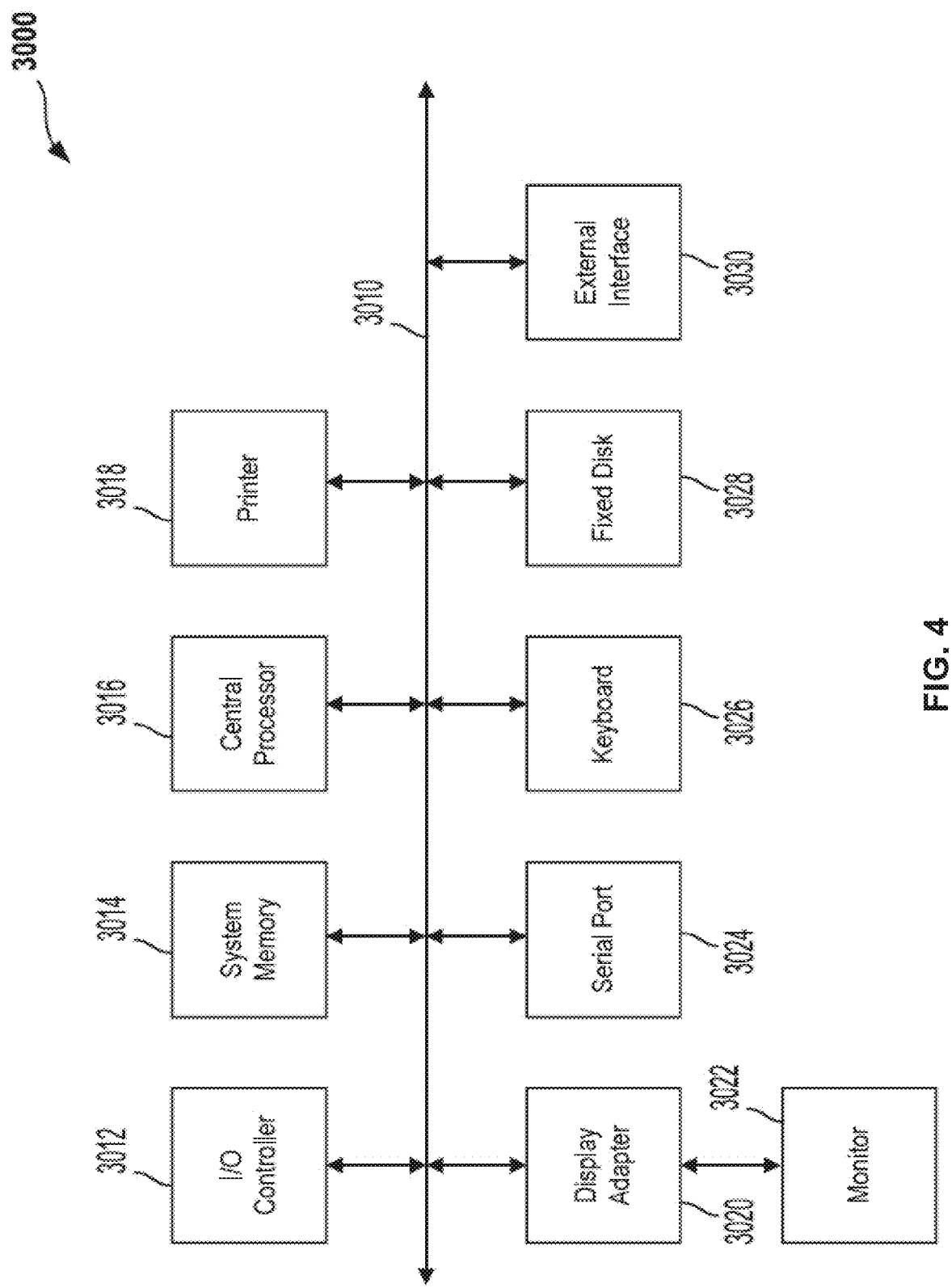

FIG. 4 presents a block diagram of a computer apparatus, according to at least aspect of the present disclosure.

Figure 5:
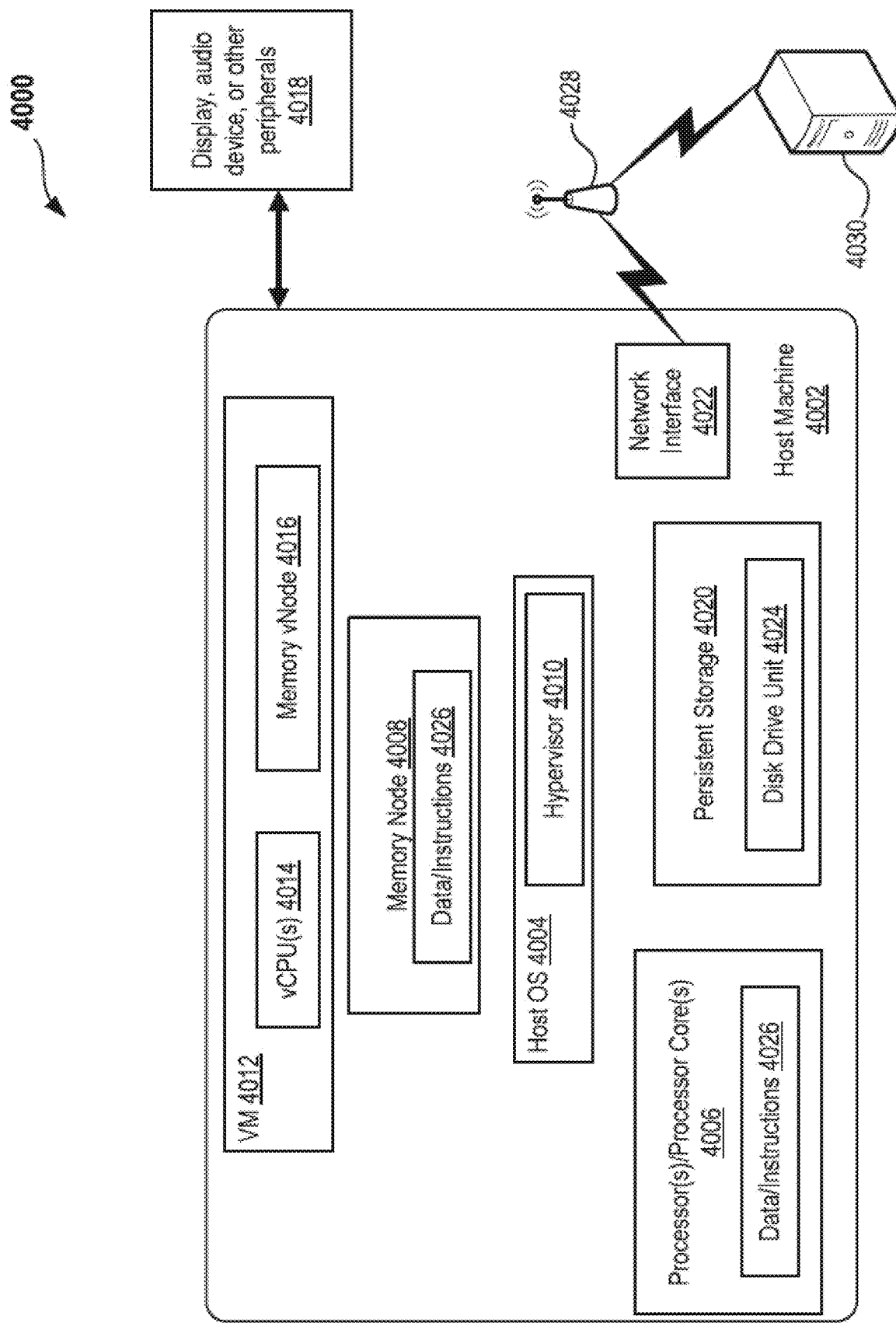

FIG. 5 is a diagrammatic representation of an example system that includes a host machine within which a set of instructions to perform any one or more of the methodologies discussed herein may be executed, according to at least one aspect of the present disclosure.

Figure 6:
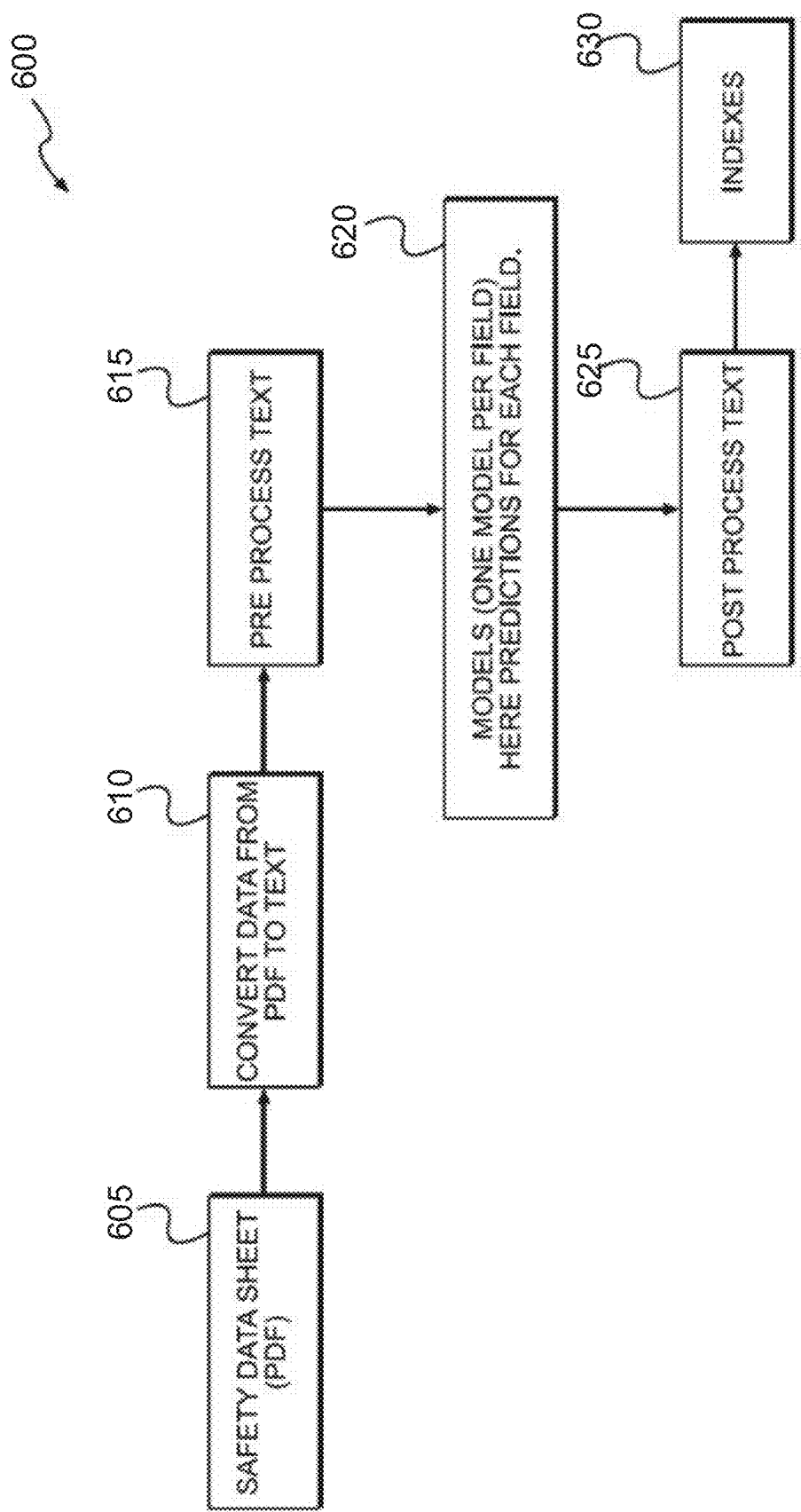

FIG. 6 illustrates a flow chart of one aspect of a method to automatically extract indexing fields from a digital data record, according to at least one aspect of the present disclosure.

Figure 7:
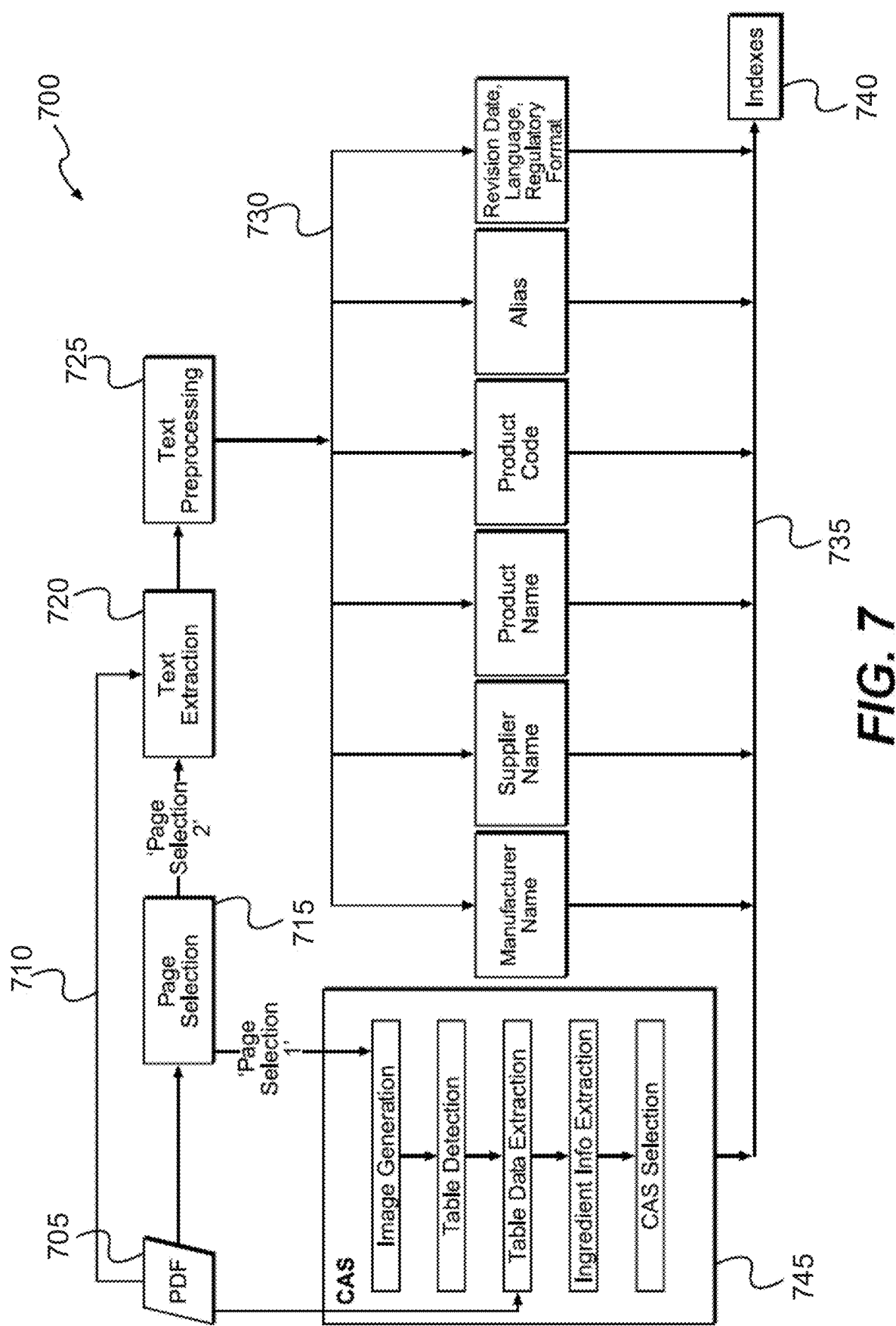

FIG. 7 illustrates a flow diagram of one aspect of a method to automatically extract indexing fields from a digital data record as well as extracting specialized information via a separate pipeline, according to at least one aspect of the present disclosure.

Figure 8:
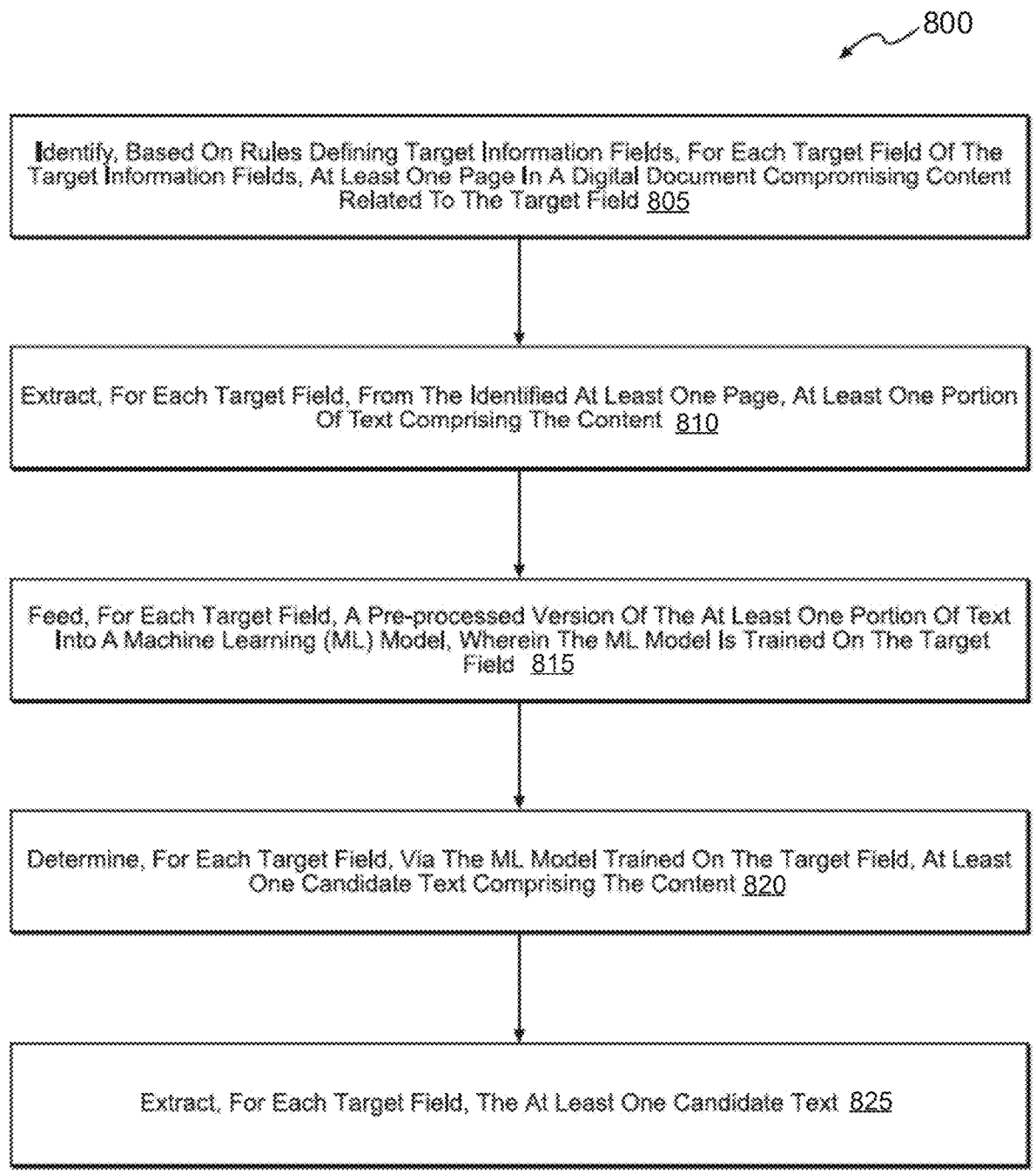

FIG. 8 illustrates a method of extracting and indexing content from a digital data record, according to at least one aspect of the present disclosure.

FIG. 9 illustrates one example of the inferences output by the methods disclosed herein to be combined and displayed, according to at least one aspect of the present disclosure.

Figure 10:
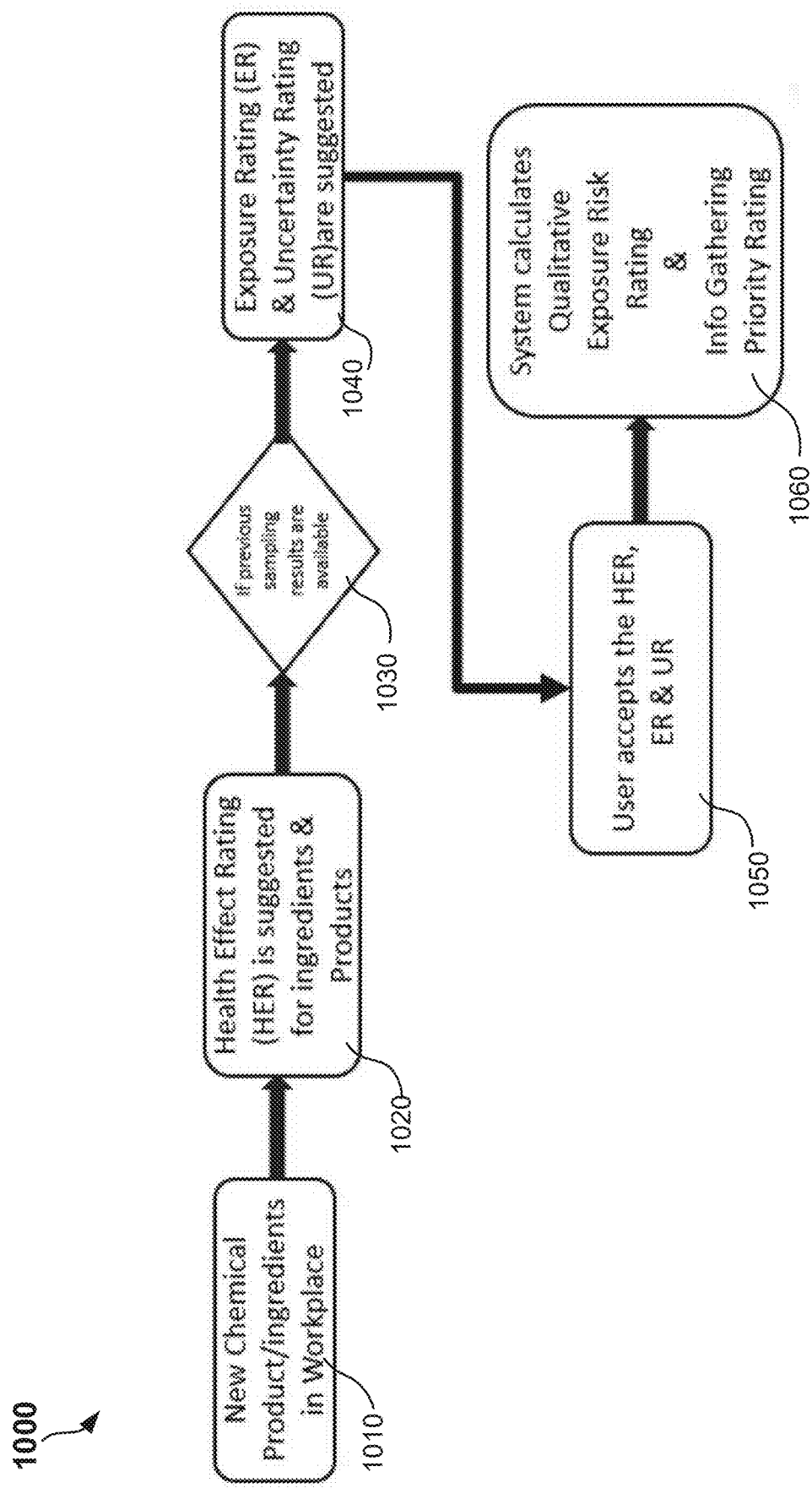

FIG. 10 illustrates a flow chart of a method configured to generate and display various stressor ratings, according to at least one aspect of the present disclosure.

Figure 11A:
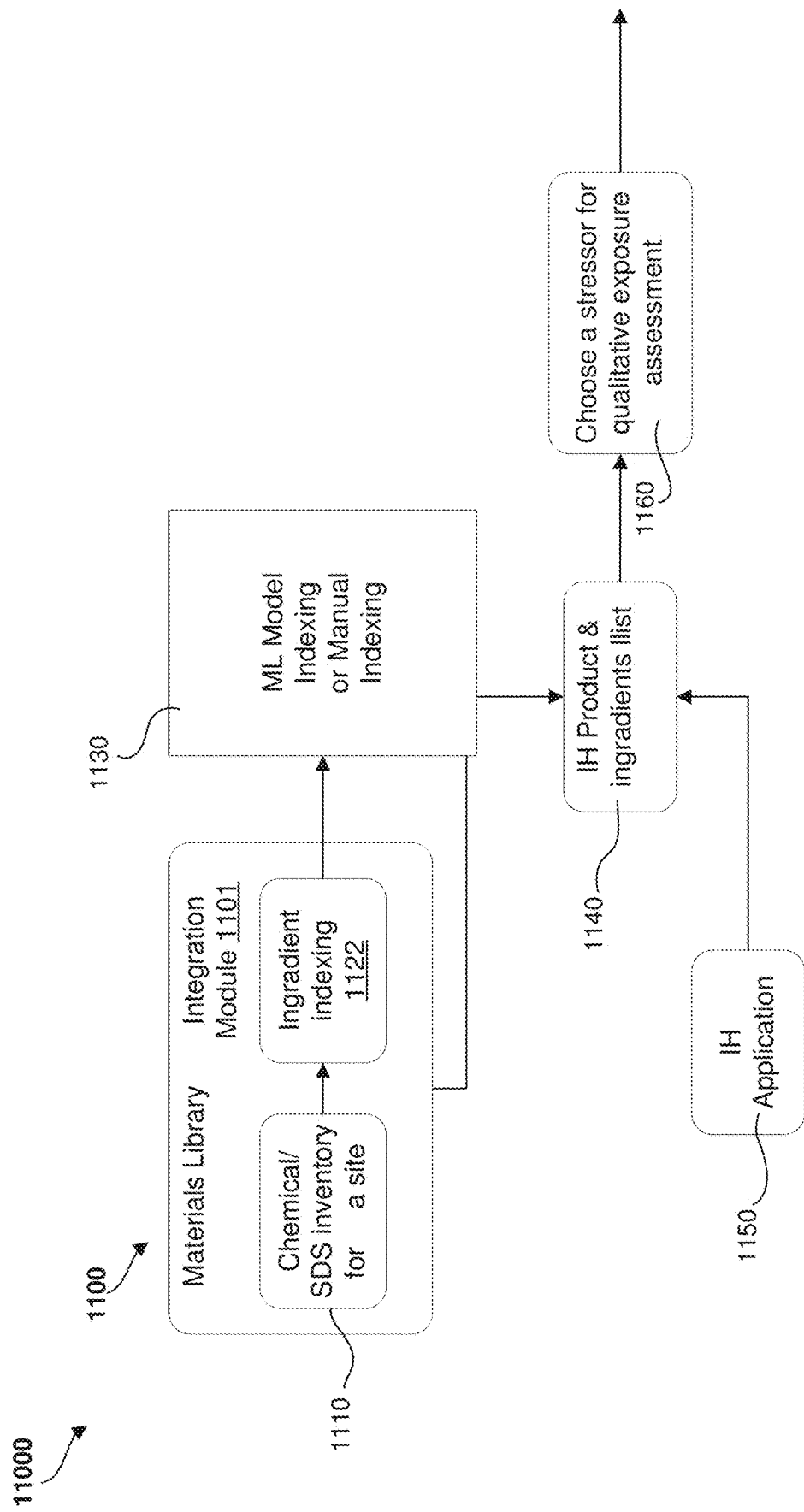

FIG. 11A illustrates a first portion of a flow chart of a method configured to generate various ratings for a stressor, according to at least one aspect of the present disclosure.

Figure 11B:
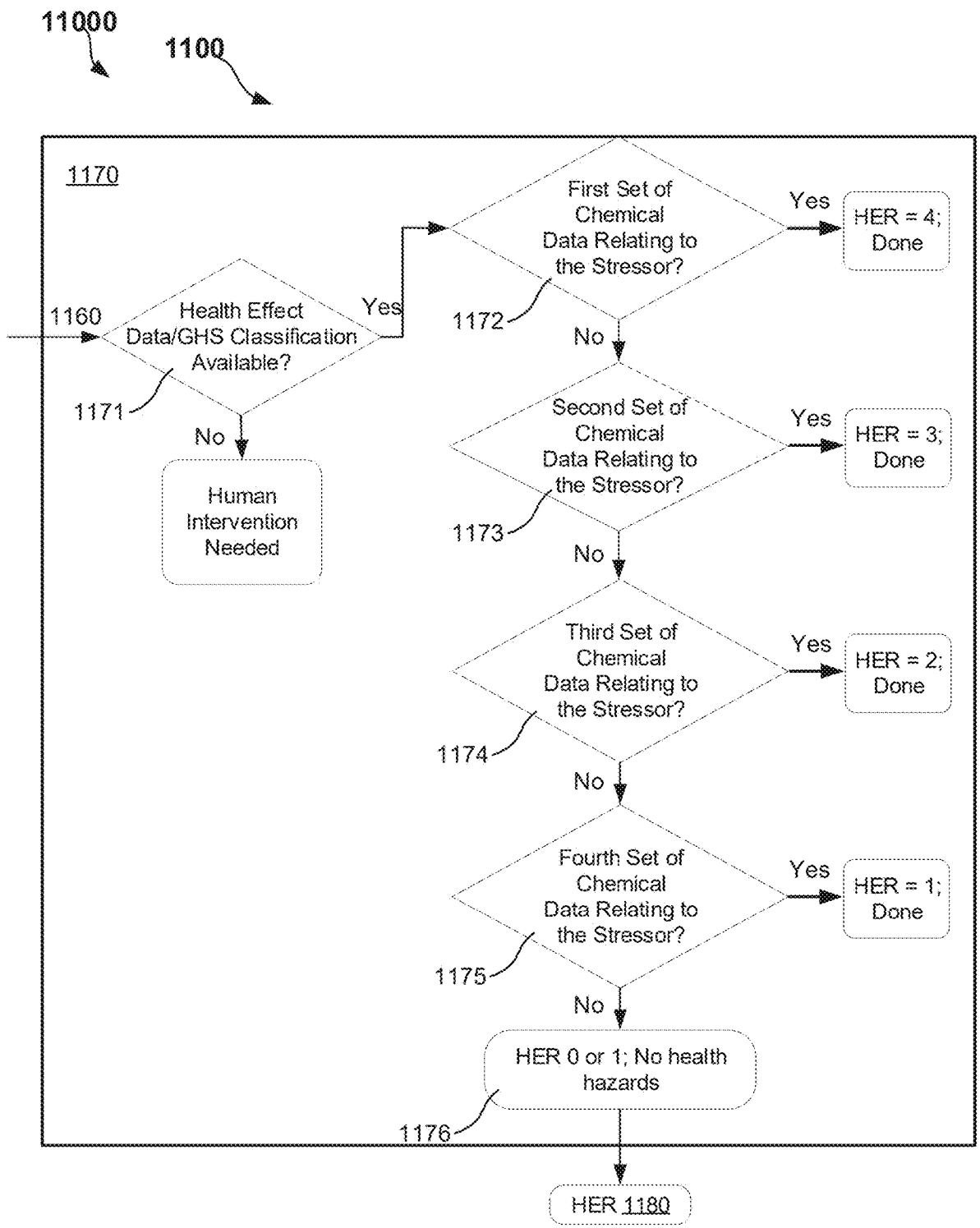

FIG. 11B illustrates a second portion of a flow chart of a method configured to generate various ratings for a stressor, according to at least one aspect of the present disclosure.

Figure 11C:
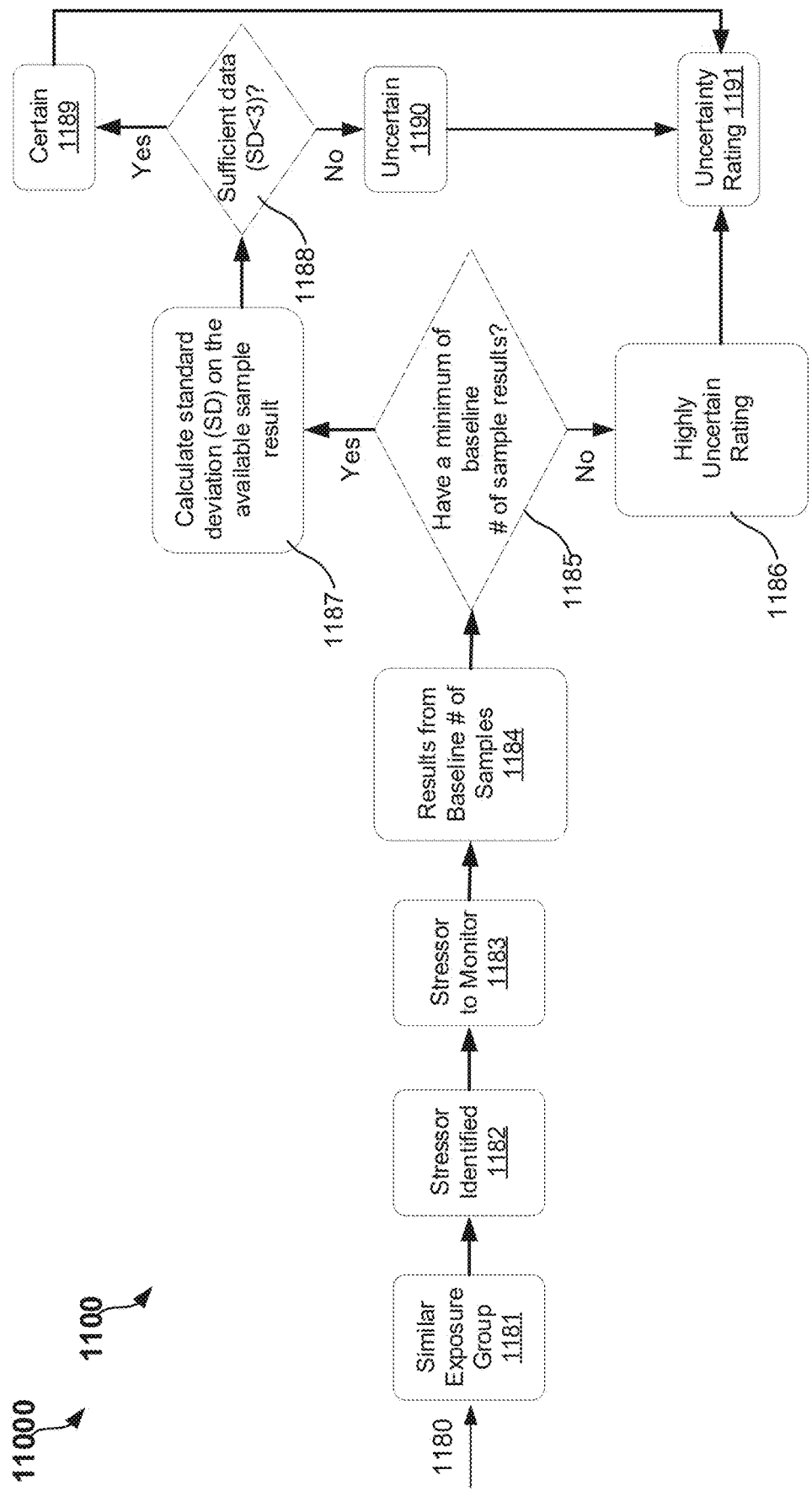

FIG. 11C illustrates a third portion of a flow chart of a method configured to generate various ratings for a stressor, according to at least one aspect of the present disclosure.

Figure 11D:
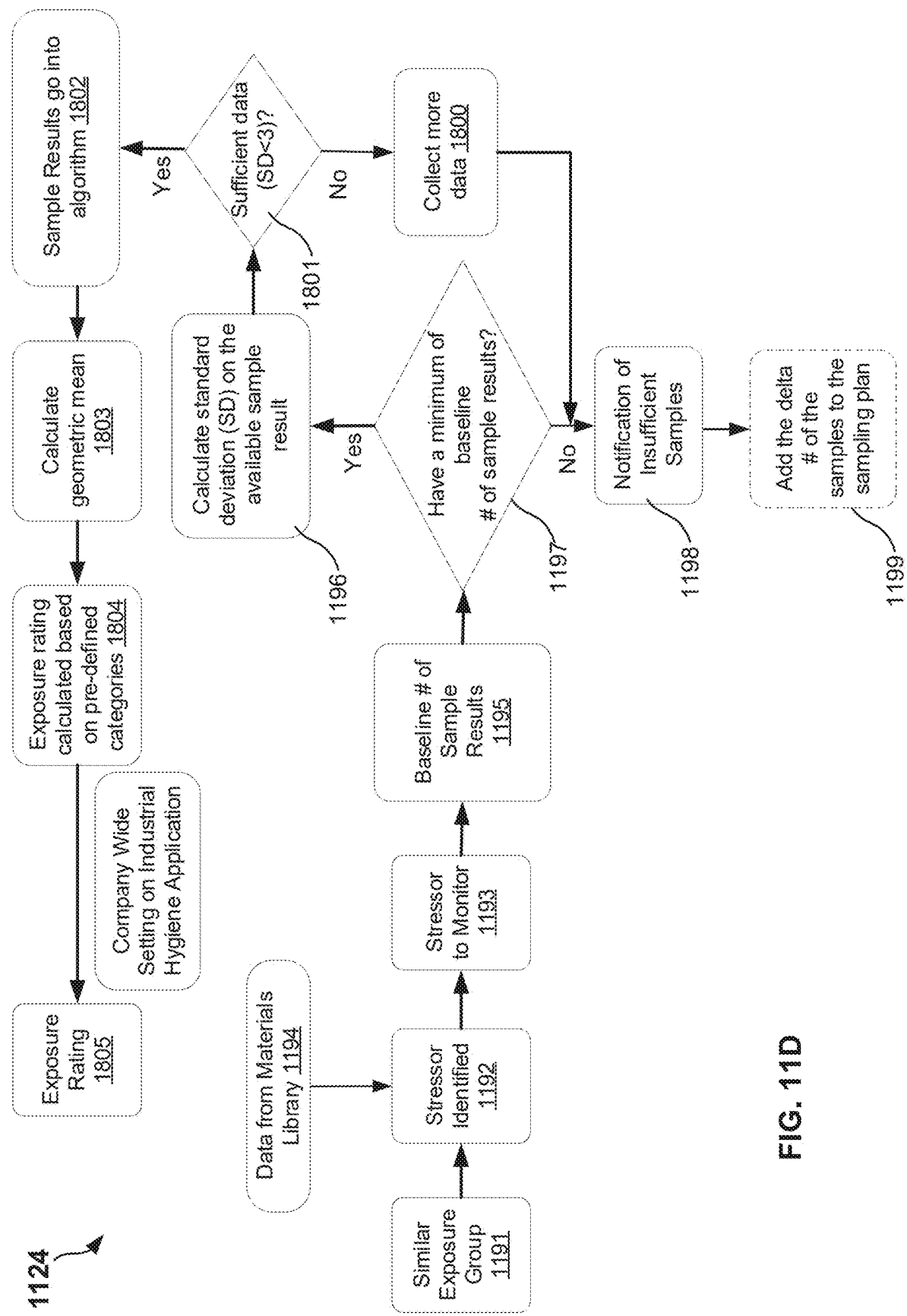

FIG. 11D illustrates a fourth portion of a flow chart of a method configured to generate various ratings for a stressor, according to at least one aspect of the present disclosure.

Figure 11E:
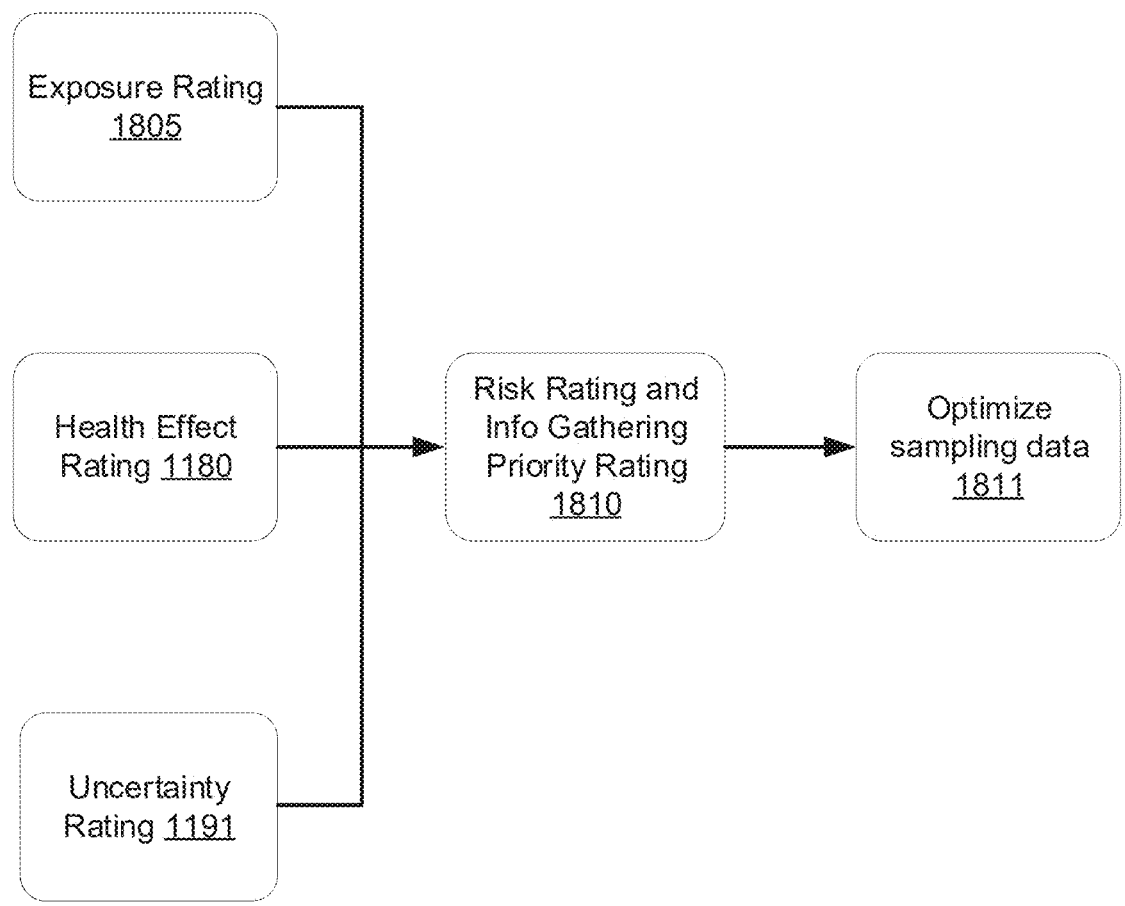

FIG. 11E illustrates a fifth portion of a flow chart of a method configured to generate various ratings for a stressor, according to at least one aspect of the present disclosure.

Figure 12A:
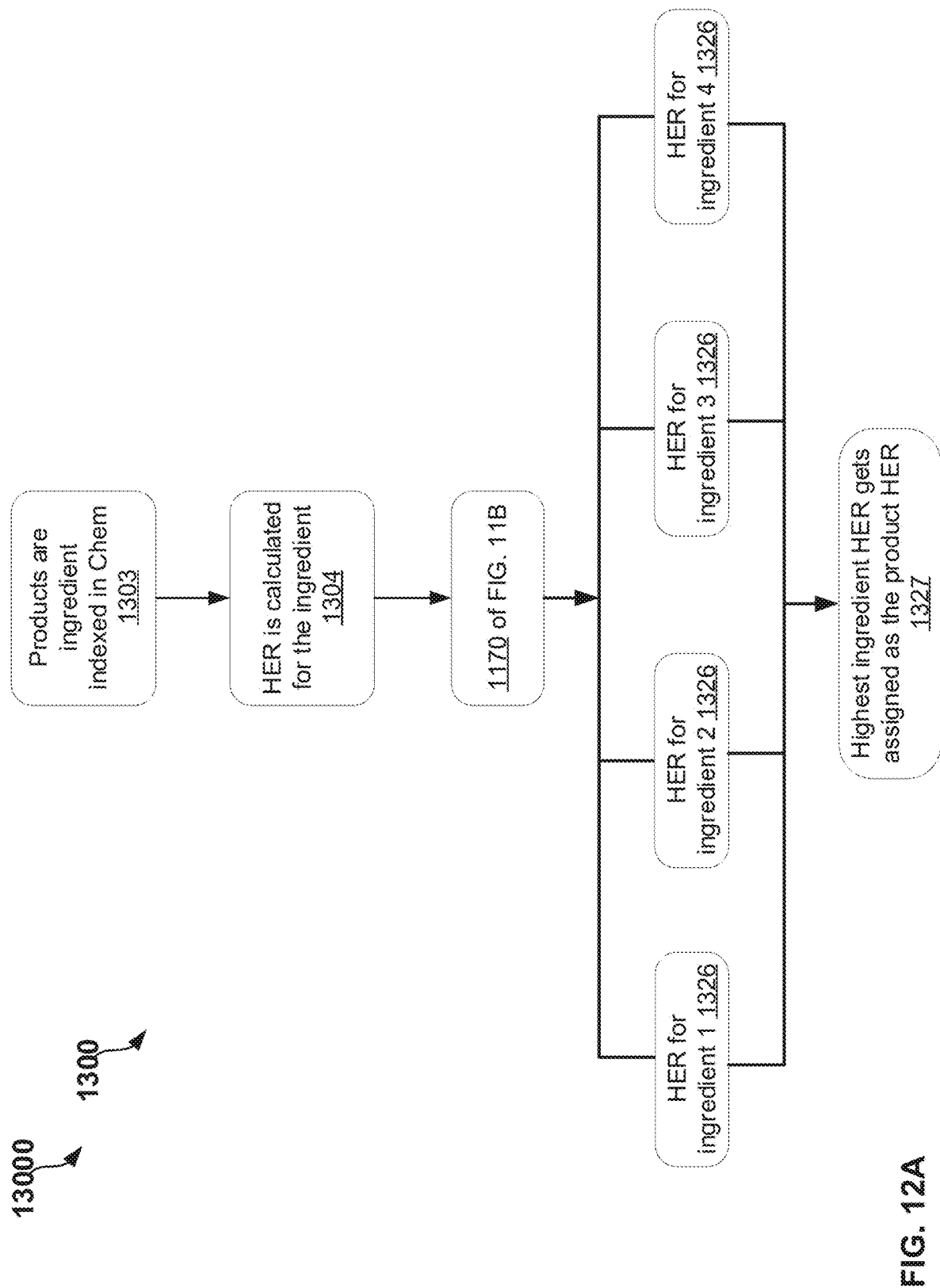

FIG. 12A illustrates a first portion of a flow diagram of another method to generate various ratings for a stressor, according to at least one aspect of the present disclosure.

Figure 12B:
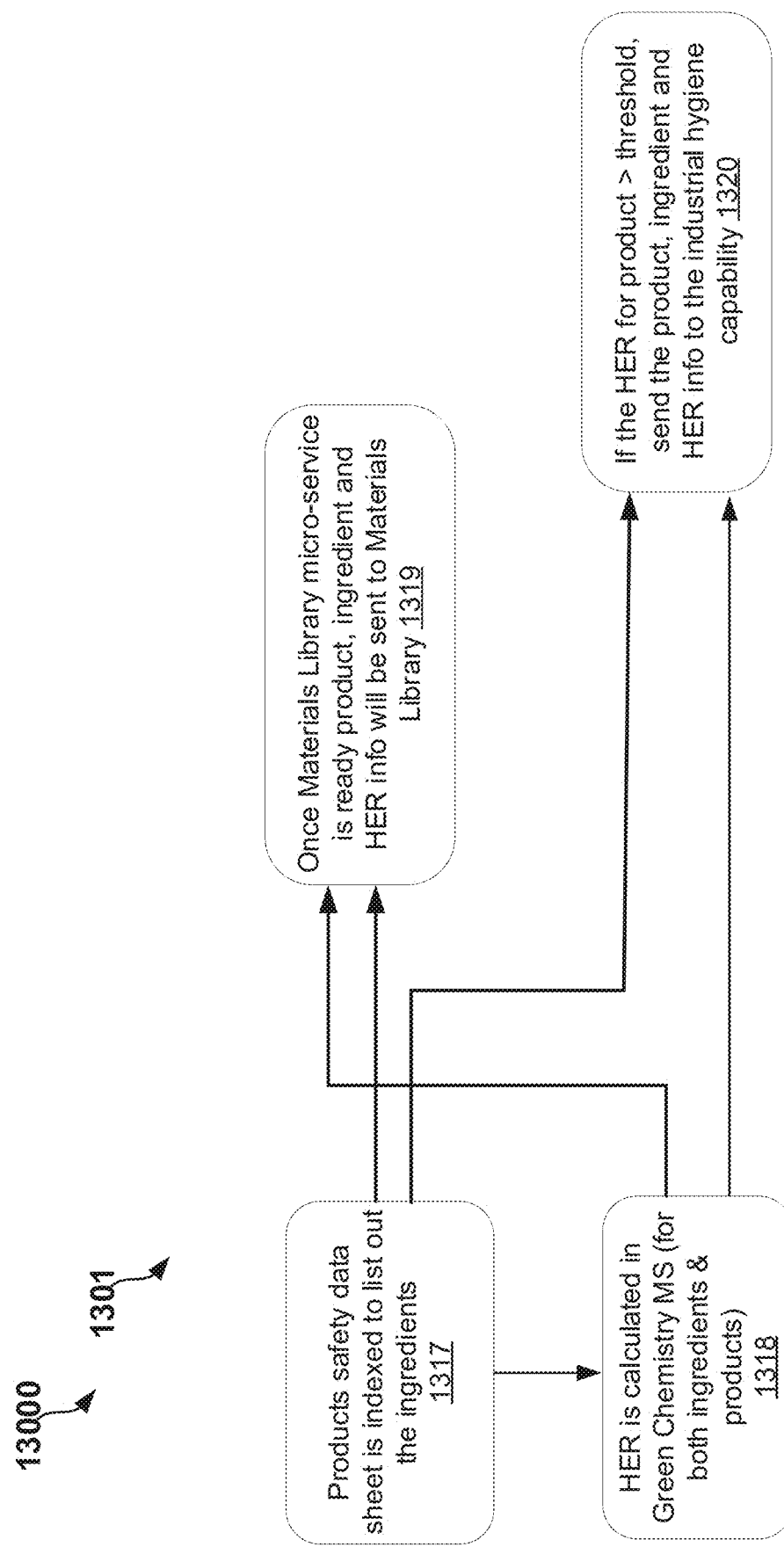

FIG. 12B illustrates a second portion of a flow diagram of another method to generate various ratings for a stressor, according to at least one aspect of the present disclosure.

Figure 12C:
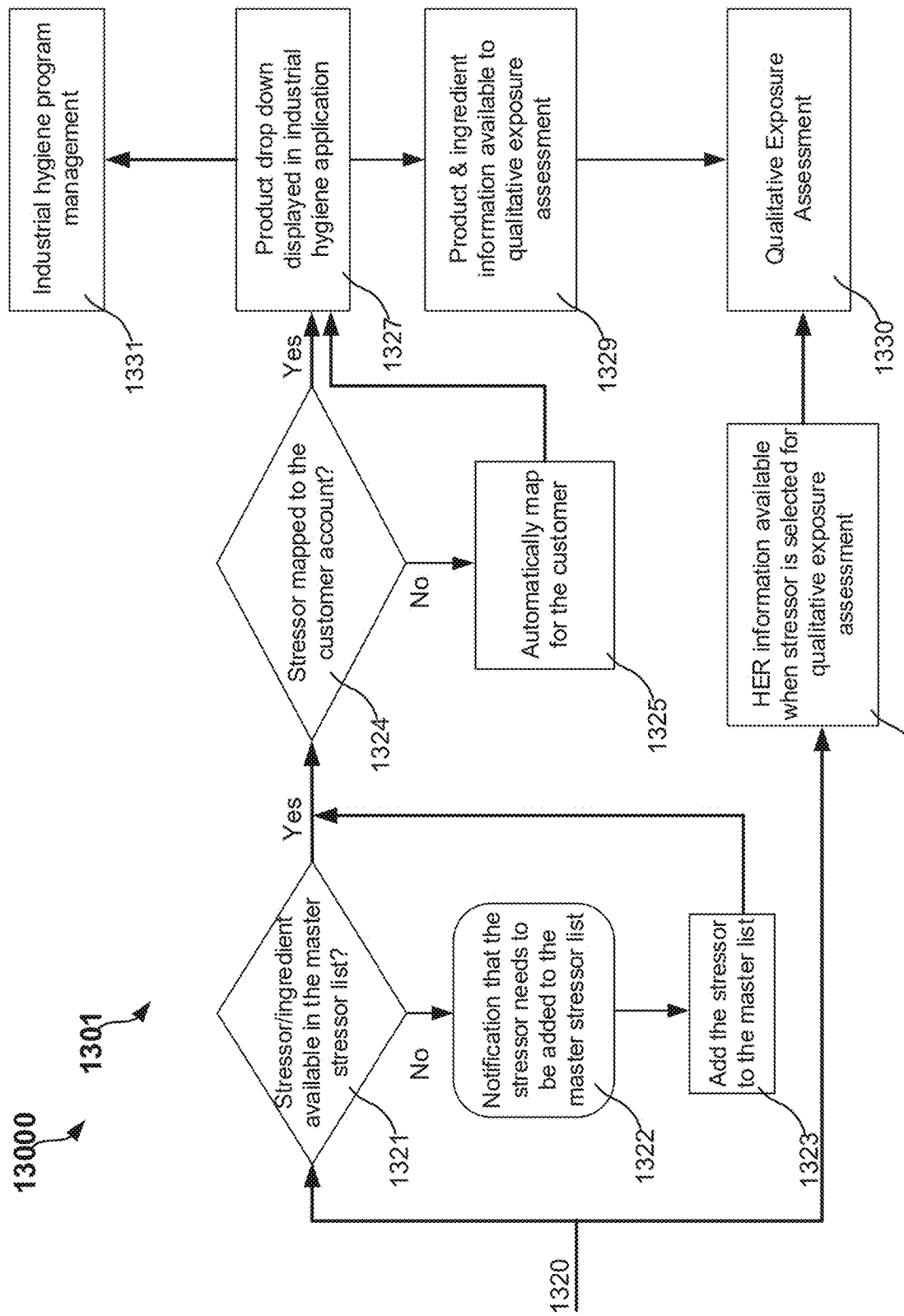

FIG. 12C illustrates a third portion of a flow diagram of another method to generate various ratings for a stressor, according to at least one aspect of the present disclosure.

Figure 12D:
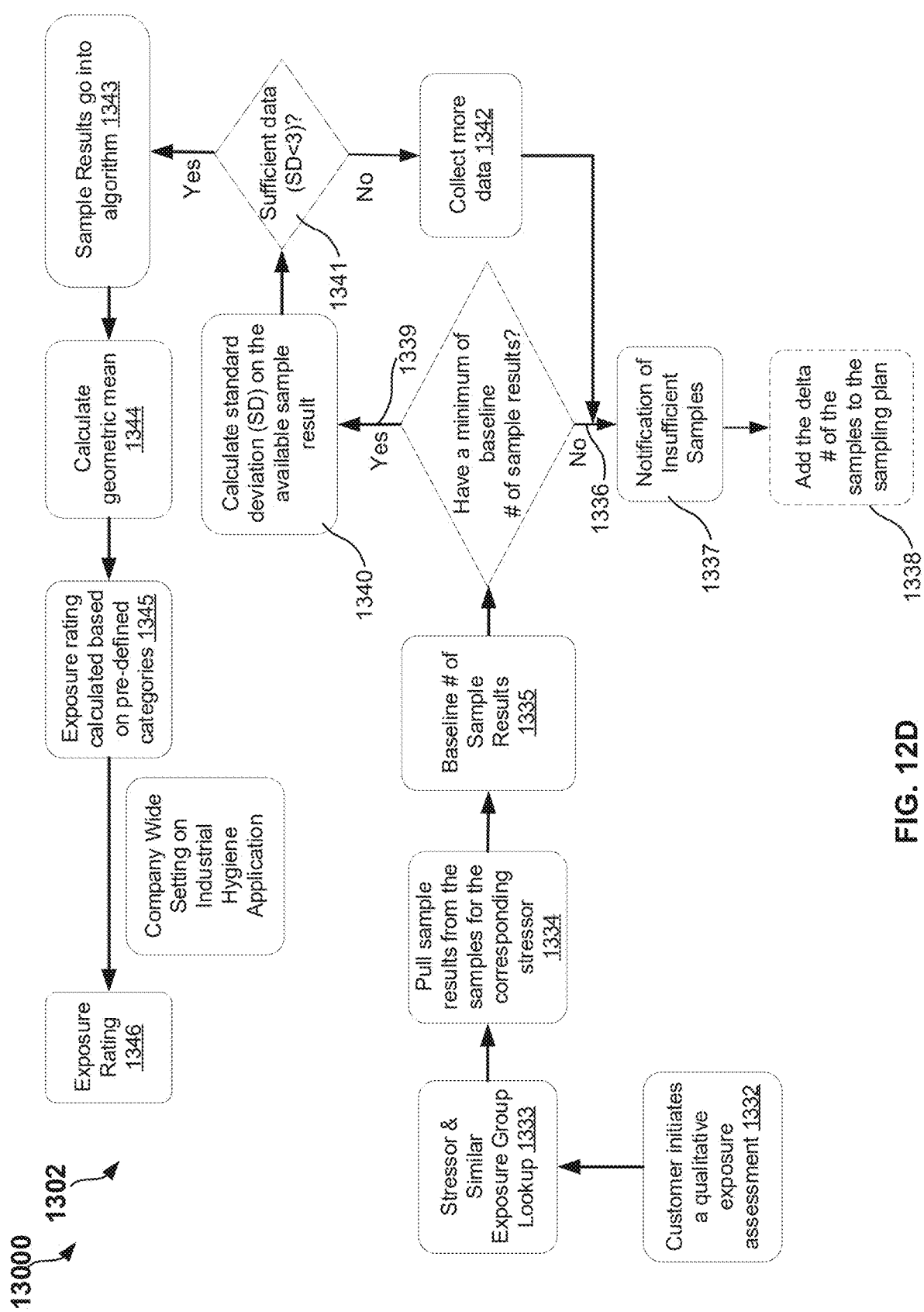

FIG. 12D illustrates a fourth portion of a flow diagram of another method to generate various ratings for a stressor, according to at least one aspect of the present disclosure.

Figure 12E:
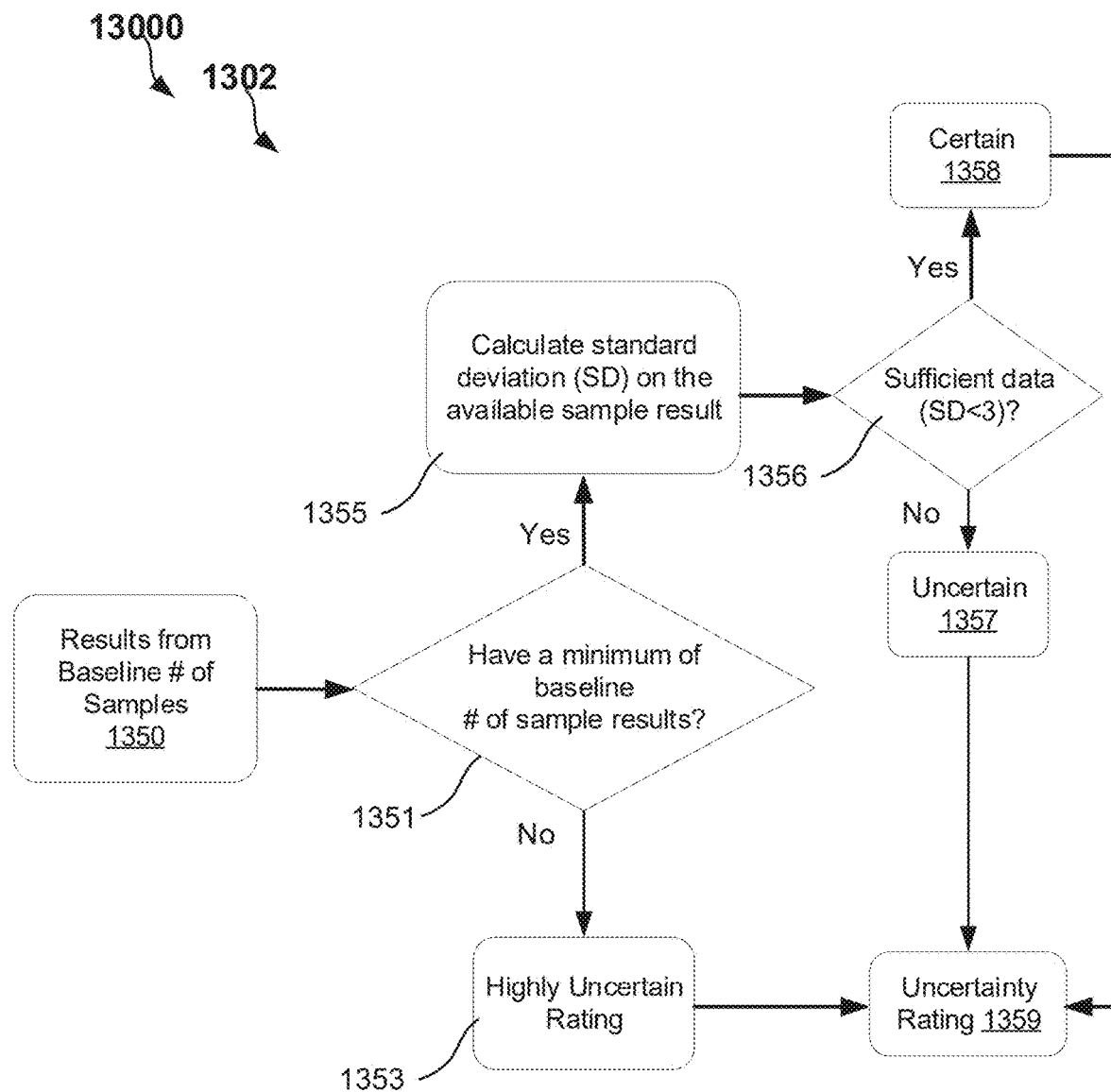

FIG. 12E illustrates a fifth portion of a flow diagram of another method to generate various ratings for a stressor, according to at least one aspect of the present disclosure.

Figure 13:
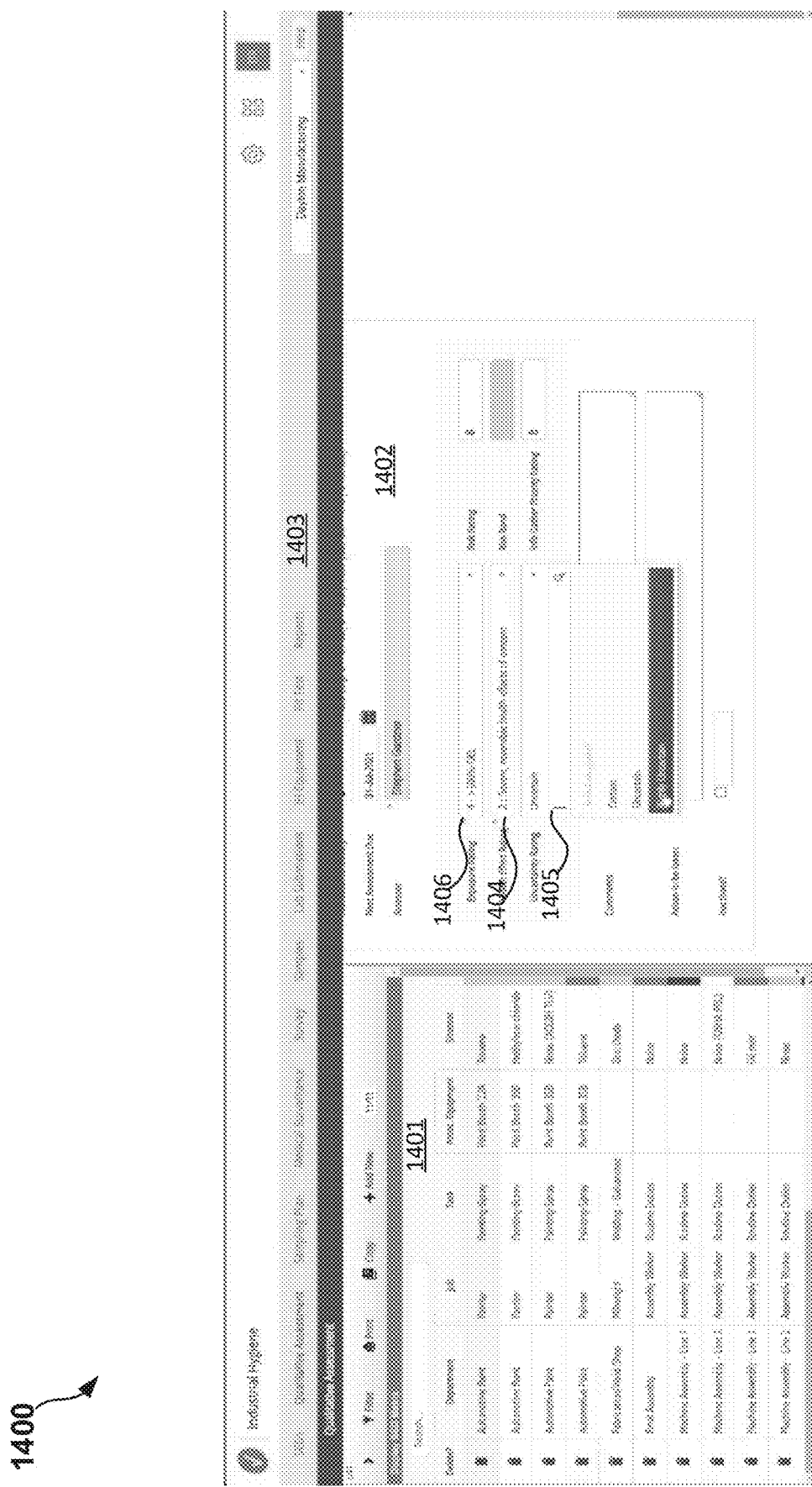

FIG. 13 illustrates one example of an interactive qualitative assessment in an interactive user interface ("interactive UI") for generating and displaying various stressor ratings, according to at least one aspect of the present disclosure.

FIG. 14 illustrates one example of an interactive table of various assessed stressor ratings, according to at least one aspect of the present disclosure.

Figure 15:
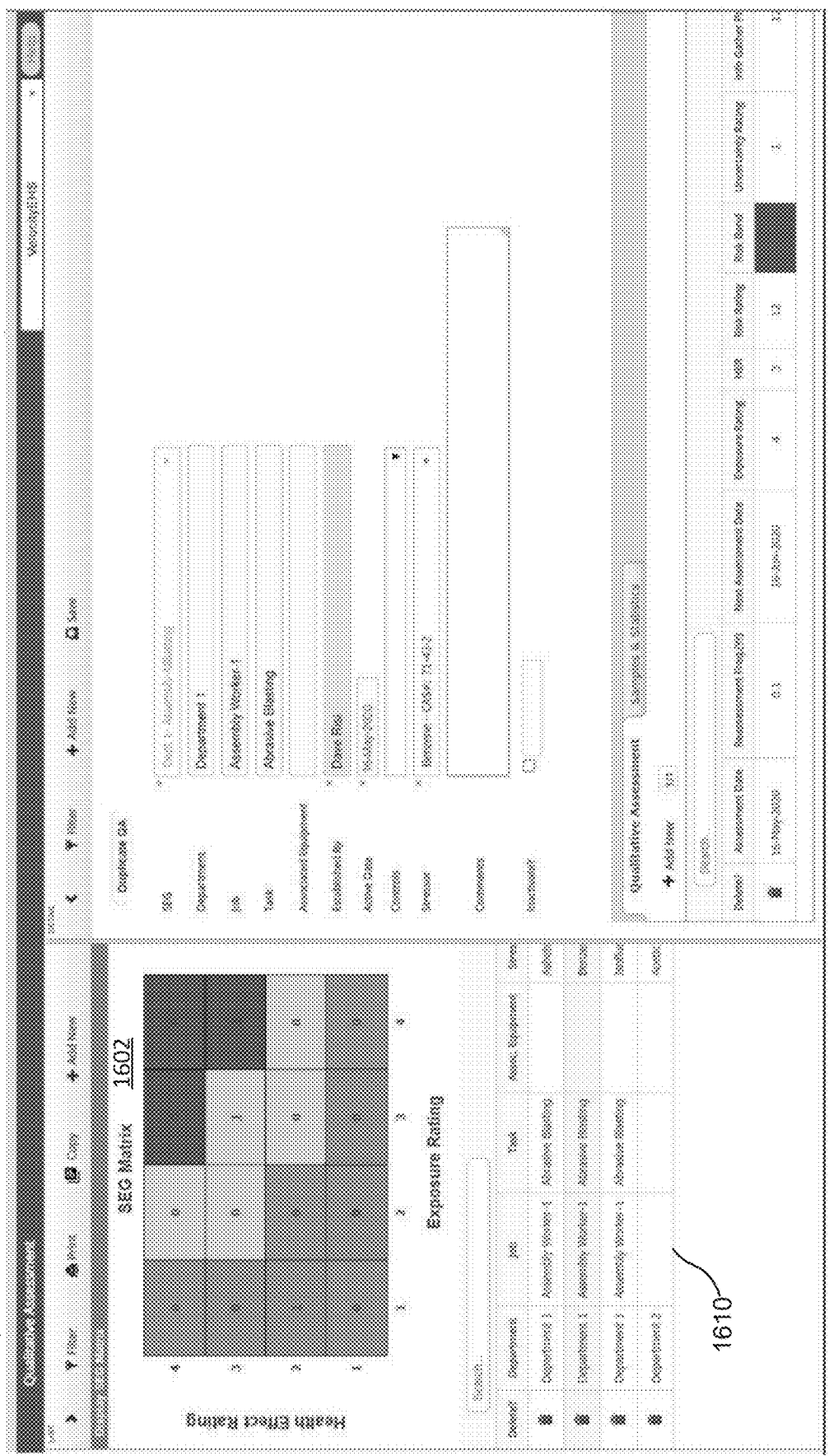

FIG. 15 illustrates one example of an interactive SEG matrix of the interactive user interface, according to at least one aspect of the present disclosure.

Figure 16:
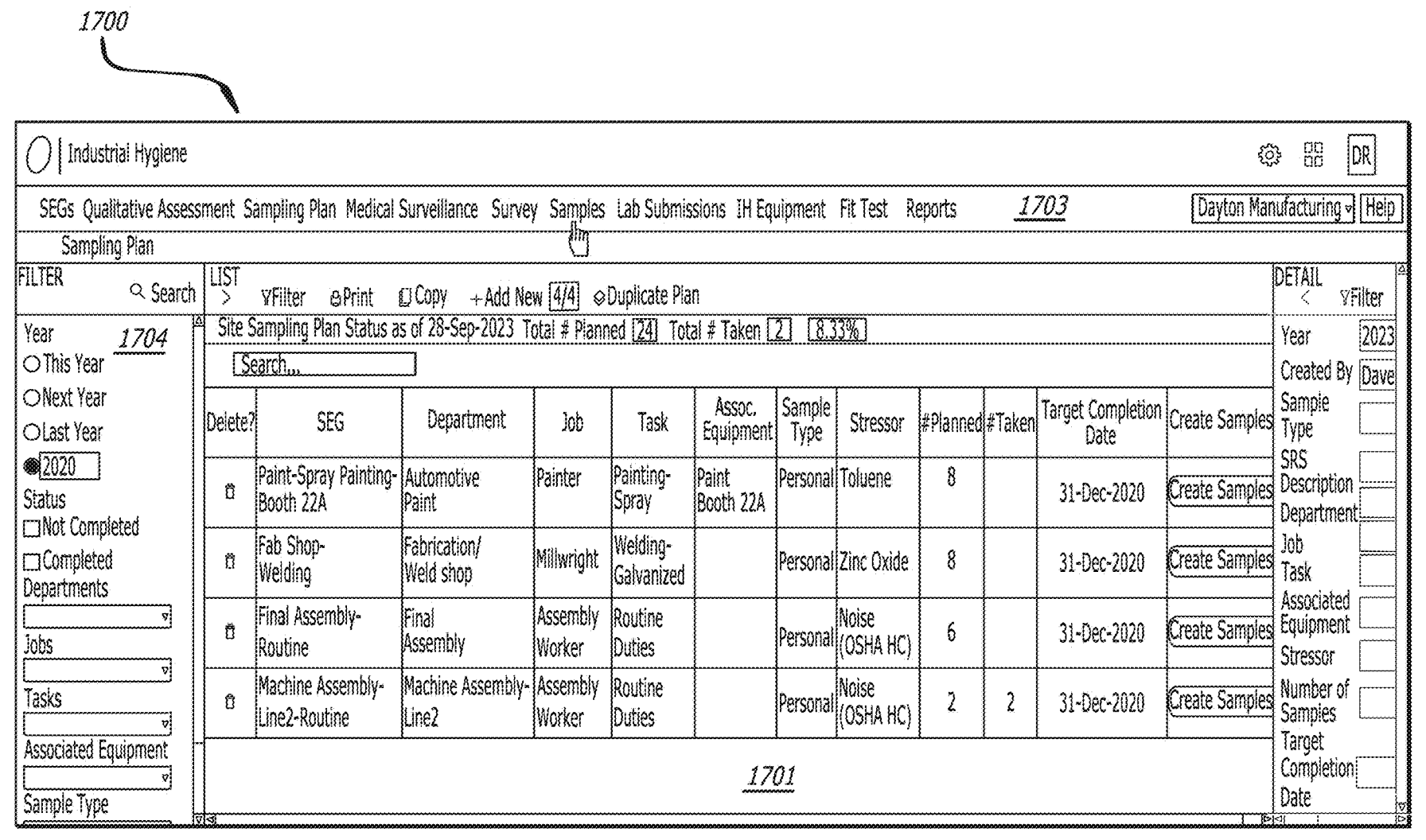

FIG. 16 illustrates one example of interactive sampling and sampling plans of the interactive UI, according to at least one aspect of the present disclosure.

Figure 17:
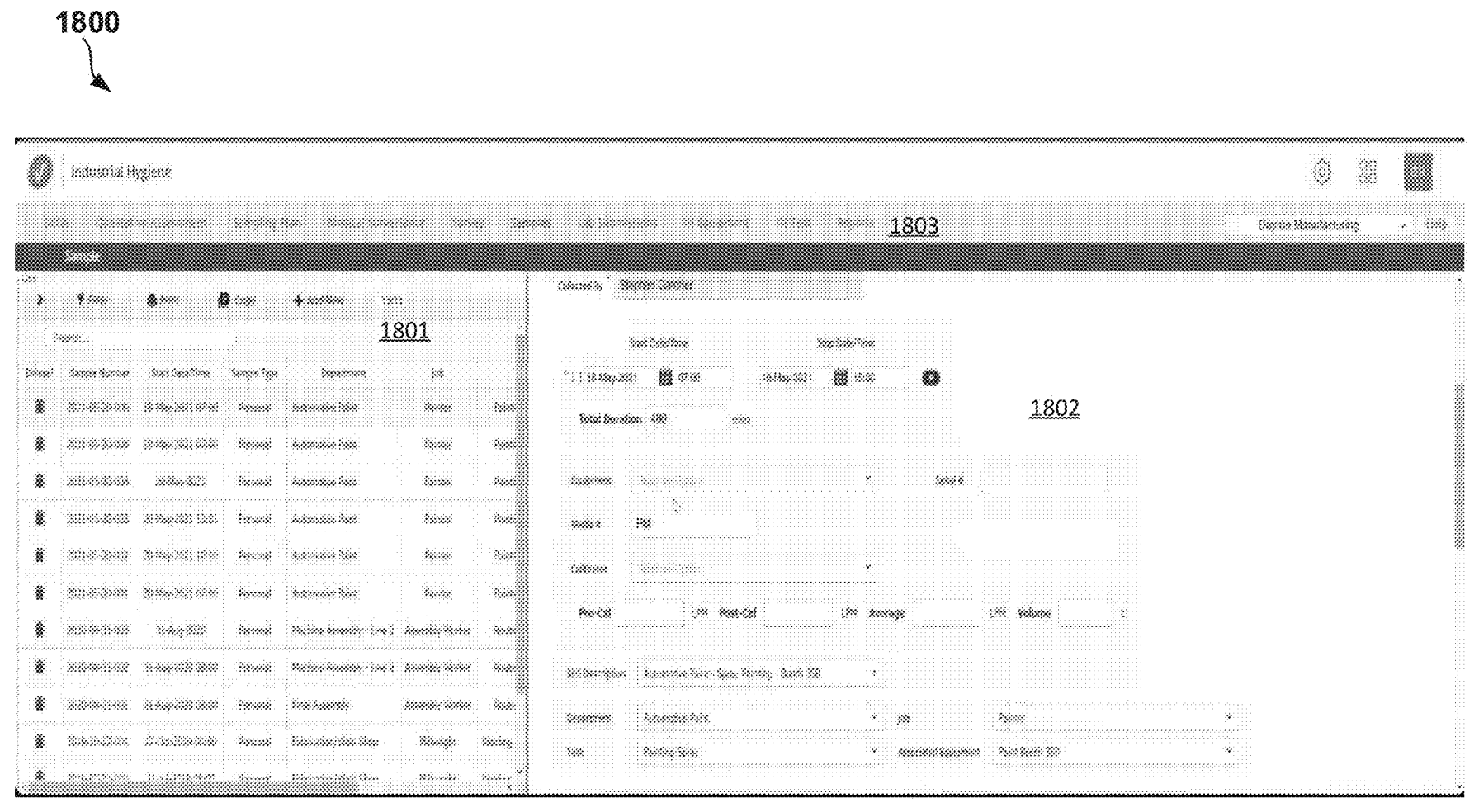

FIG. 17 illustrates one example of interactive sampling of the interactive UI, according to at least one aspect of the present disclosure.

Figure 18:
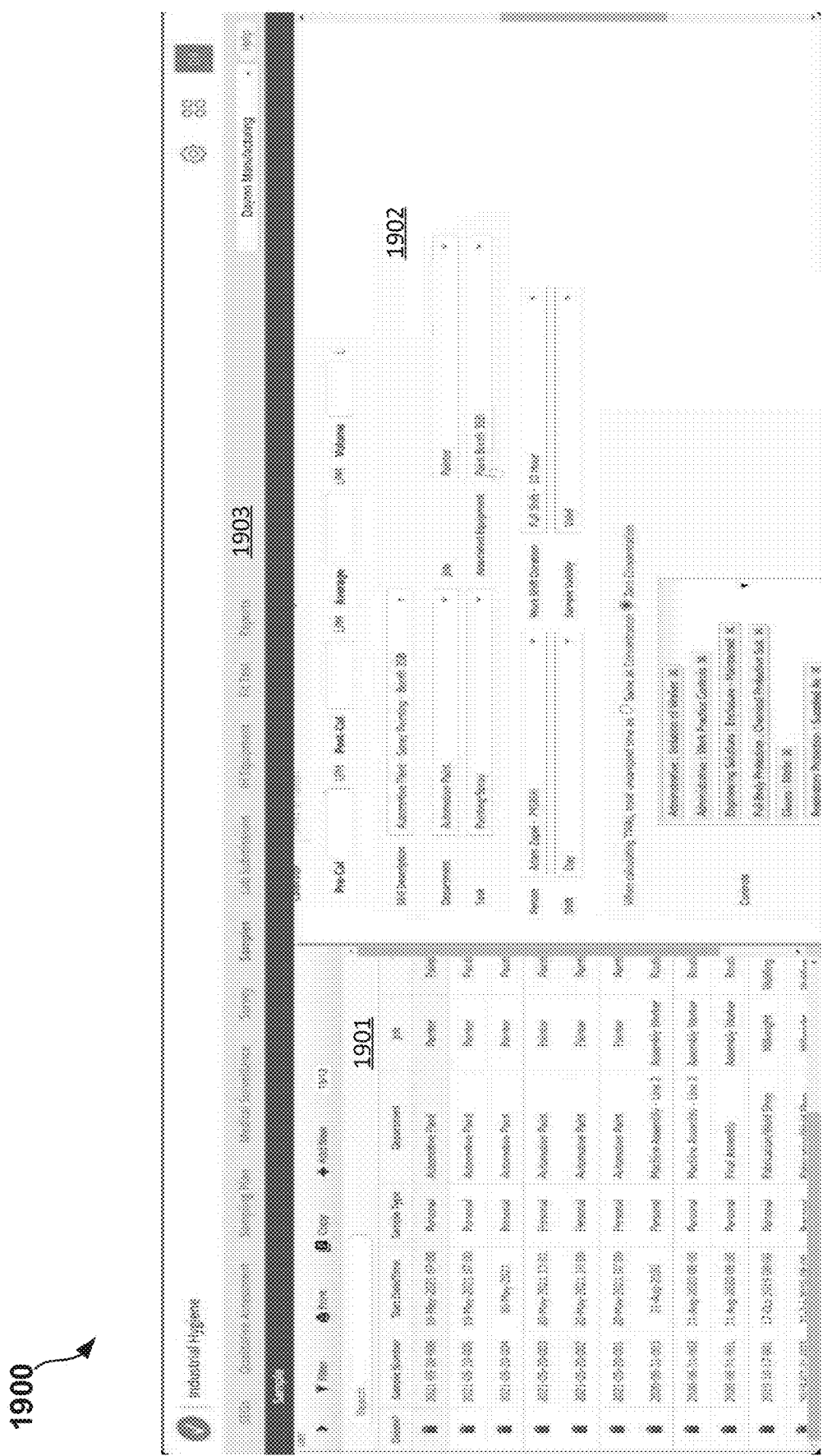

FIG. 18 illustrates another example of interactive sampling of the interactive UI, according to at least one aspect of the present disclosure.

Figure 19:
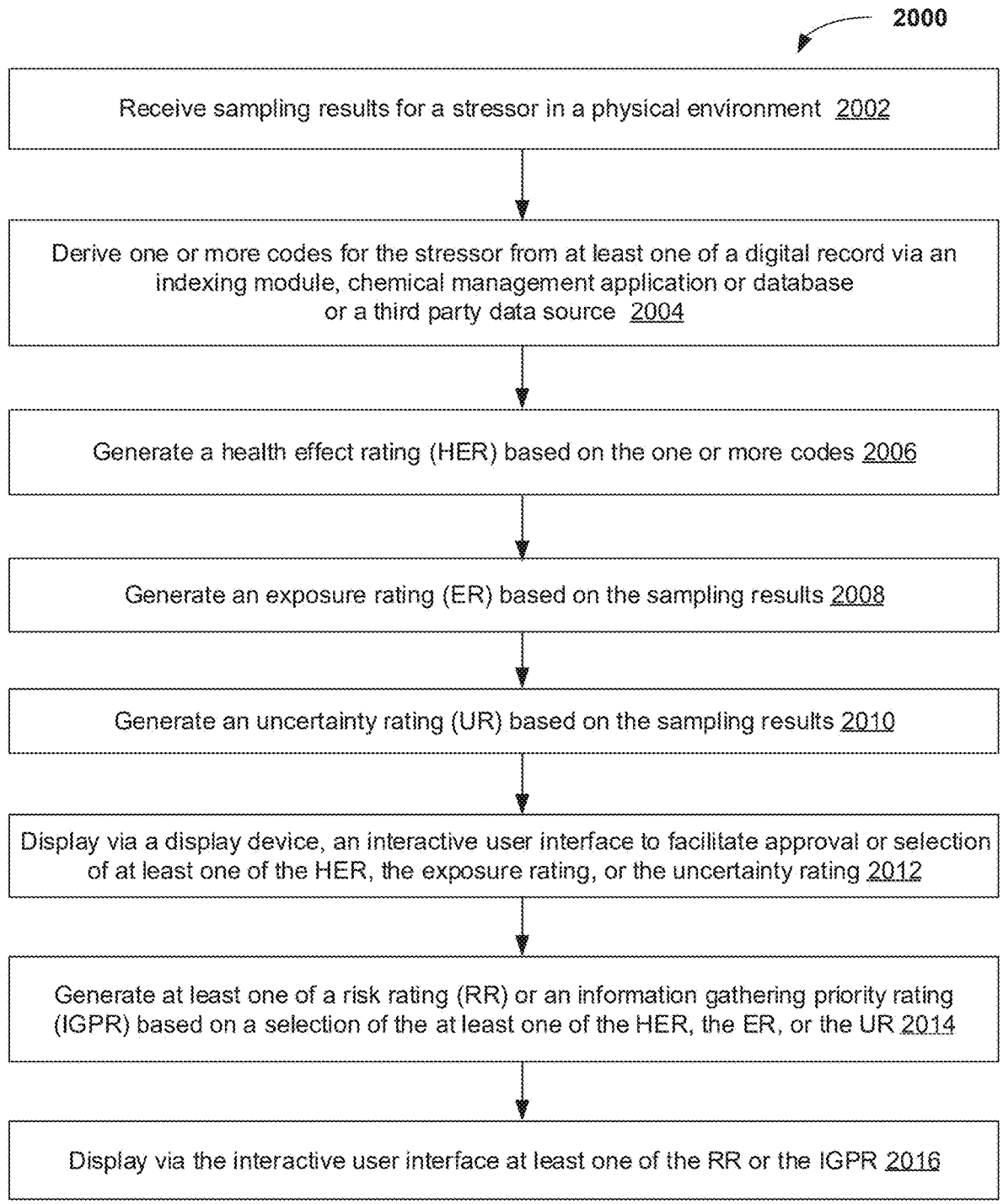

FIG. 19 illustrates a flowchart of a computer implemented method for automated industrial hygiene risk assessment and display, according to an exemplary aspect.

DETAILED DESCRIPTION

Before discussing specific embodiments, aspects, or examples, some descriptions of terms used herein are provided below.

As used herein, the term "computing device" or "computer device" may refer to one or more electronic devices that are configured to directly or indirectly communicate with or over one or more networks. A computing device may be a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to send, receive, process, and/or output data, and normally includes a display device, a processor, a memory, an input device, a network interface, and/or the like.

As used herein, the term "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible.

Reference to "a device," "a server," "a processor," and/or the like, as used herein, may refer to a previously recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, the term "system" may refer to one or more computing devices or combinations of computing devices (e.g., processors, servers, client devices, software applications, components of such, and/or the like).

Industrial hygiene and ensuring the safety of employees is of vital importance in the work place, for employers and businesses. For example, chemical manufacturing plants can contain various roles or jobs where employee(s) are exposed to one or multiple chemical ingredients, products, agents, toxins, radiation, noise, or other harmful-to-humans environmental conditions (these are interchangeably referred to herein as a "stressor"). Companies and businesses take various steps including deploying industrial hygienists and other experts to assess and to take actions to mitigate these stressors and their effects in each role, job or area in the workplace, or other a physical environment.

An industrial hygienist generally scores and provides assessment ratings based on measurements or a number of samples/measurements of various stressors and environmental conditions, however, this is a time-consuming process that requires intensive manual labor and resources to undertake stressor sampling and assessments. Various documents must also be sprawled through to determine chemical codes and hazards of the specific chemical stressors involved.

The rise of the digitization of documents across all platforms and industries, and the movement away from manual indexing, identification, and sorting of paper-based documents has led to various technological solutions to parse, analyze, index, or extract information from digital data records. However, none of currently available technological solutions are able to identify, index, and extract targeted and complex information from a digitized document or data record based on what the user desires, especially if the text is highly variable and contains unpredictable features. While searching or matching key words or phrases in digital data records is common, indexing targeted complex information is difficult when using different types of documents or data records, for example text and image-based documents, and where the information is within various different structures, for examples within tables, under sections, in cells, free text and the like. The combination of all these factors makes it difficult for autonomous technical solutions to be able to index sought or targeted information by a user.

Disclosed herein are systems and methods that provide a technical solution to automate indexing, extracting, and identifying targeted information in complex data structures in documents, and scaling this automation to be usable for large volumes of complex data structures, including digital data records such as safety data sheets (SDSs) and then using the content of that data in various assessment and rating algorithms and user interfaces. An SDS document (also referred to herein as "data record" or "digital record" or "digital data record") usually covers a chemical product, its name, and various details. The SDS is generally divided into multiple sections, usually 16, where a chemical ingredient or composition section is present in one of the sections. A chemical product covered by the SDS may be composed of a single ingredient that may be arranged in a tabular or other format.

FIG. 1 illustrates a flow chart of one aspect of a system to automatically index and extract tabulated information in a document, according to at least one aspect of the present disclosure. System 100 may facilitate information to be requested or sought from a document 101, which may be a digital data record, of a text or image format, such as a PDF. Document 101 may also be an SDS. Document 101 may be text or image based. A user seeking specific information in document 101 (this sought specific information is also referred to herein as "targeted information" or "target information") may input 102 document 101 into a page selection module 103 that may execute one or more processes or threads, or be comprised of multiple other components or modules to select or identify one or more pages in document 101 where the targeted information resides. In various embodiments, page selection module 103 may be comprised of various disparate processes, which may be undertaken on an individual device, or on multiple devices, that select at least one page containing target information.

Page selection module 103 may in various aspects, be configured to identify page(s) within a document 101 that contains target information, for example chemical composition information in an SDS, and select these page(s), to be included in a list for example of all identified page numbers. For example, to identify or select a page document 101 is parsed to extract the text from the document using extraction software such as PDF extraction software. In some aspects, this extracted text is cleaned and passed as a string of characters, alphanumerical text, and/or numbers to another stage in a pipeline or process executed by page selection module 103.

To identify a page in document 101 with target information, a combination of rules designed to determine the beginning and end sections in the text/string of characters, along with the presence of targeted information is used. This may include a combination of rules to identify composition of chemical ingredient information in document 101, when it is an SDS, along with the presence of the relevant ingredient information within an identified section. In particular, regular expressions, or expression matching may be used to identify section headers, chapters, and other identifiers of different sections in the text or strings of document 101. Regular expressions or expression matching may also be used to detect particular numbers or numerical patterns, or patterns of numbers, for example CAS numbers. Expression matching can also be used to detect known words, expressions, or phrases such as ingredient labels. All these various forms of expression matching may be used to identify various components of document 101.

Page selection module 103 may also contain a machine learning component. The machine learning ("ML") network may be a natural language processing ("NLP") machine learning model trained to detect specific names, words, symbols, phrases, alphanumerical combinations, or expressions. In one example, the NLP model may be trained to detect the presence of chemical ingredient names. In one aspect, the NLP model used is a pre-trained Bidirectional Encoder Representations from Transformers (BERT) Named Entity Recognition (NER) model, fine-tuned on a custom dataset. In several examples, the custom dataset may contain texts of the composition section of SDS documents. The model takes the text split into tokens as the input and is designed to identify three categories of tokens: a first word in a name, phrase, or expression, for example, the first word of the chemical ingredient name, the subsequent words of the name, phrase, or expression, such as a chemical ingredient name, and the words not belonging to the name, phrase or expression, such as the chemical ingredient name. In this step, the system uses the model to look for the presence of any tokens belonging to name, phrase, or expression, such as the example chemical ingredient name.

If the expression matching and/or NLP model fail to identify target information, for example chemical ingredient information, names, or compositions of chemicals in SDS documents or document 101, then pre-determined or pre-set rules may be used or autonomously implemented by the module 103 to find target information. Rules may be designed and configured for various configurations or documents. Depending on the target information sought, or the structure of the information, for example being in a table or unstructured text, or a list or otherwise, the rules that are implemented by page selection module may be altered accordingly. An example of rules that may be applied when target information includes chemical ingredient information may be rules configured to determine or check if the beginning and end of a chemical composition section is on the same page. If the text between the sections contains the relevant ingredient information, the page is added to the list for pages to be selected by module 103.

A pre-configured rule may also include to check or determine if only the beginning of a section is found on any page. If the text after this point contains the target information, such as relevant ingredient information, the page is added to the list of correct pages. A rule may also determine or check if only the end of a section is found on any page. If the text before this point contains the relevant or target information, for example ingredient or chemical information, the page is added to the list of correct pages. Finally, if all these fail, then a fall back search or one-off very specific identification matching query may be run, for example if no correct pages are identified, the module 103 determines or checks if a specific number or numerical pattern is present in a specific section, such a fallback rule may include determining if a CAS number is present in section 1 of a document 101. If yes, then page 1 is the correct page and is selected. Any combination of the methods and processes described above may be used by page selecting module 103 or by individual processes or devices to select a page with target information in document 101.

Once a page(s) is selected, in various aspects, the selected pages by module 103 are input into an image generation module 106 where image 107 is generated of each selected page. System 100 may continue by identifying location of sections, or depending on the type of document 101, a table, chart, list or other form of structured information or data, sought or other configuration specifying the type of data or data structure sought. In one aspect, a data structure or section identification module 108 may be or include a machine learning model component, for example a Computer Vision ("CV") machine learning network trained for the purpose. The CV model may in several instances include a pre-trained Cascade Mask R-CNN object detection model, fine-tuned on a custom dataset containing images of SDS documents.

In several aspects, the output of section identification module 108, or a component of it, for example CV network or model, receives an input of the image(s) 107 that was generated, for example by the image generation module 106, detects the structure with the target information, or the relevant section of the target information and outputs coordinates 109 of the sections in the image containing the target information. If the CV machine learning network or model is unable to identify the location or coordinates of sections containing target information, either because it fails to do so or because the data is not structured in the way the model was trained to detect, this could occur for example if a CV model is trained to detect tables or data in tables, but the information or data was not in a table but in another format such as sections, or free-flowing text. In these cases, coordinates 109 of sections containing the target information may be obtained by running optical character recognition (OCR) in addition to a combination of pre-set rules, which may be identical or at least similar to those applied by module 103 to identify target information in order to select the page. The coordinates 109 are in either case used as inputs in other parts of system 100.

System 100 may also comprise a table data or section extraction module 110 which relies on the input coordinates 109 to extract the tables from the provided image. In several aspects, document 101, identified or selected page numbers 104 in addition to coordinates 109 are input into a process pipeline or a table data or section extraction module 110 which by using the input coordinates 109 along with selected page numbers 104 may extract target information from the correction sections of the pages corresponding to the selected page numbers 104 of document 101. This extracted information may then be the output of the extraction module 110. In some aspects, the table data or section extraction module 110 extracts the target information in its original structure, as extracted data 111. In various aspects for example, a tabular structure is extracted and then converted into a 2D data structure such as a data frame. In other embodiments, the whole section or tabular structure is extracted as extracted data 111. In several embodiments, the target information is directly extracted as extracted data 111 from the ascertained coordinates 109 and pages 104 from document 101.

System 100 may then retain the structure of the target information in extracted data 111 as a 2D data frame or in another data structure format. The extracted data 111 is then input into a target information extraction module 112 that in various aspects maybe configured to be a chemical ingredient data extraction module. In several aspects, the target information extraction module 112 outputs target information as data 113, which could be in any type of file, including a .csv file format. In numerous aspects, the extracted data 111 retains the tabular structure, which is used in the subsequent step to identify weight percentages of chemicals and to use these known associations between different parts of extracted data 111, for example the chemical names, CAS numbers, and weight percentages. This could for example be done by associating the weight percentages of chemicals to associate with previously identified or extracted weigh percentages.

System 100 may remove noise from extracted data 111, which may include steps to clean textual data. Associations in the cleaned data may then be used to identify specific target information by the target information extraction module 112. For example, if the system 100 is directed towards extracting and obtaining chemical ingredient information, it may use known associations between the data to determine ingredient names along with the corresponding CAS numbers and weight percentages. Alternatively, there may be no known associations, but associations are identified at the tabular structure, or other data structure, generally within the area of the identified page(s) that the CV model has selected. The extraction module may be comprised of an NLP Machine learning model, which may be the same or a different NLP model to the one used to select pages on in page selection module 103. In several aspects, the NLP model may be a BERT NER model that identifies specific text, expressions, names, or phrases, for example chemical ingredient names in extracted data 111.

Tokens may be generated or the tokens generated at the page selecting process may be reused, for example, the text is split into three categories of tokens: the first word of a name, or phrase, such as a chemical ingredient name, the subsequent words of the name or phrase, such as the chemical ingredient name, and the words not belonging to the name or phrase, such as a chemical ingredient name. System 100 uses the model to look for the presence of any tokens belonging to a name or phrase such as a chemical ingredient name. The NLP model may make predictions for each token of the text individually, and additional post-processing rules are used to get the full names, such as a full name of a chemical ingredient instead of just abbreviations or symbols.

The table or data structure that was extracted may be scanned by system 100 or the NLP model to look for target name and identify the rows and columns containing them. Some columns may contain other information that are associated with the target names or phrases being sought, in the example of SDS documents, the columns (or rows in some aspects) containing CAS numbers and weight percentages are identified using regular expressions, or expression matching and the tabular structure of the data is used to determine an association between the chemical names, CAS numbers, and weight percentages. Multiple other associations or associated information may be inferred, determined or extracted from the information in the columns or rows. In the SDS document example, the regular expressions for CAS numbers are also designed to identify non-numerical values like trade secrets, mixture information and the like. The final output 113 is a 2D structure where each row corresponds to an ingredient, and the columns correspond to the different pieces of information belonging to an ingredient. This can be stored in a structured database or a file 113.

FIG. 2 illustrates a flow diagram of one aspect of a method 200 to automatically index targeted information in a digital data record, according to at least one aspect of the present disclosure. With reference now primarily to FIG. 2 together with FIG. 1, in one aspect, method 200 may commence by selecting 205 a page number of a digital data record, for example document 101, FIG. 1 to identify a page containing targeted information. This in many aspects could occur for example via a page selecting module 103 of FIG. 1. The page corresponding to the selected page number may then be input 210 as an image into a visual machine learning network (visual ML), and/or into a visual detection module, for example section identification module 108 of FIG. 1. The visual ML may identify 215 a section of the image that contains the targeted information, the section may be identified by coordinates. Method 200 may then continue to inputting 220 the page number, the digital data record, and the coordinates of the identified section in an extraction module, for example table data or section extraction module 110 of FIG. 1. The extraction module may then extract 225 the targeted information from the section that was identified 215. In various aspects, any of the processes, systems, or methods in system 100 of FIG. 1 may be combined with method 200, and in any order or combination.

In several aspects, method 200 may also comprise inputting the extracted targeted information into a NLP ML network, that may for example be part of module 112 of FIG. 1, and identifying at least one data item, by the NLP network, based on a structure of the extracted targeted information. The data item may be of any type, and in the context of SDS documents may include for example chemical names, CAS numbers, and chemical structure weights. Similar to the system 100 of FIG. 1, the selecting 205 of a page number may be comprised of various processes and depending on the aspect may comprise parsing the digital data record to produce a string of characters and then identifying relevant portions in the string of characters containing the targeted information. Furthermore, the identification of these relevant portions may itself comprise splitting the produced string of characters into tokens which are input into a NLP ML network, and then identifying by the NLP a first word of a chemical ingredient name, a subsequent word of a chemical ingredient name, or a word not belonging to any chemical ingredient name.

In instances where the NLP fails to identify these names, then specific predetermined rules may be implemented to select page numbers containing targeted information. For example, these rules could include adding a page number to a list, once the system determines that both a beginning part and an end part of a relevant portion are on the same page. In other instances, a page number may be added to a list, if the system determines that a beginning part of a relevant portion is on a page, but not the end part of the relevant portion, and that the targeted information is on a subsequent page to the beginning part or section. A page number may also be added to a list if the end part of a relevant portion but not the beginning part is on a page, and the targeted information is on a previous page to the end part. Alternatively, if a specific number, for example a CAS number or other symbol or alphanumerical combination is on a page, the system may add that page to a list of relevant pages.

In several aspects, the relevant pages may include sections that have section headers, specific numbers, alphanumeric combinations, or keywords, wherein the identification is undertaken via expression matching in the string of characters. In several embodiments, when a page number is identified, then an image is generated of the page corresponding to the page number in the document. This image may then be used as an input for example in a table or section detection module 108 of FIG. 1.

FIG. 3 illustrates a flow chart of one aspect of a method 300 to train multiple types of machine learning networks to autonomously identify targeted information, according to at least one aspect of the present disclosure. In one aspect, method 300 commences with parsing 305 a custom dataset containing texts of digital data record to produce a string of characters. The custom dataset may be one curated specifically to train a machine learning network to identify specific information. For example, when training a machine learning network such as an NLP model to determine chemical names, CAS numbers, weightings and other information related to chemical ingredients, the custom dataset may be comprised of numerous SDS documents. Method 300 may then continue by identifying 310 portions in the string of characters containing information, and then split 315 the string into tokens that are then fed into a machine learning network for training. The processes 305-315 may be considered as preprocessing data in method 300 to prepare the training dataset. The machine learning network, which is an NLP model is then trained 320 by the tokens input into it. The training may comprise inputting the tokens into the NLP model; and outputting by the NLP model, a label where each of the tokens are identified or classified into a category. In one example embodiment, there may be three categories, and the token is categorized or classified into one of them. Example classifications or categories of tokens may be a first word of an ingredient name, subsequent word of an ingredient name, or not belonging to an ingredient name.

In several aspects, method 300 may continue with training a visual machine learning network (visual ML) such as a CV model on an image-based dataset, to recognize text or portions/sections of pages or images associated with pertinent information in an image. The pertinent information may be target information, such as chemical ingredient information. The training may comprise inputting image data from an image-based dataset into the visual ML; and outputting coordinates of identified relevant portions containing the pertinent information. The coordinates may include or border sections, tables, or other formatted information that is considered pertinent information. Once both the NLP model and the visual ML model are trained on provided datasets, then these models or networks may be utilized in any of the processes described above in relation to FIGS. 1-2, and in any order or combination.

FIG. 4 is a block diagram of a computer apparatus 3000 with data processing subsystems or components, which a set of instructions to perform any one or more of the methodologies discussed herein may be executed, according to at least one aspect of the present disclosure. The subsystems shown in FIG. 4 are interconnected via a system bus 3010. Additional subsystems such as a printer 3018, keyboard 3026, fixed disk 3028 (or other memory comprising computer readable media), monitor 3022, which is coupled to a display adapter 3020, and others are shown. Peripherals and input/output (I/O) devices, which couple to an I/O controller 3012 (which can be a processor or other suitable controller), can be connected to the computer system by any number of means known in the art, such as a serial port 3024. For example, the serial port 3024 or external interface 3030 can be used to connect the computer apparatus to a wide area network such as the Internet, a mouse input device, or a scanner. The interconnection via system bus allows the central processor 3016 to communicate with each subsystem and to control the execution of instructions from system memory 3014 or the fixed disk 3028, as well as the exchange of information between subsystems. The system memory 3014 and/or the fixed disk 3028 may embody a computer readable medium.

FIG. 5 is a diagrammatic representation of an example system 4000 that includes a host machine 4002 within which a set of instructions to perform any one or more of the methodologies discussed herein may be executed, according to at least one aspect of the present disclosure. In various aspects, the host machine 4002 operates as a standalone device or may be connected (e.g., networked) to other machines. In a networked deployment, the host machine 4002 may operate in the capacity of a server or a client machine in a server-client network environment, or as a peer machine in a peer-to-peer (or distributed) network environment. The host machine 4002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 4000 includes the host machine 4002, running a host operating system (OS) 4004 on a processor or multiple processor(s)/processor core(s) 4006 (e.g., a central processing unit (CPU), a graphics processing unit (GPU), or both), and various memory nodes 4008. The host OS 4004 may include a hypervisor 4010 which is able to control the functions and/or communicate with a virtual machine ("VM") 4012 running on machine readable media. The VM 4012 also may include a virtual CPU or vCPU 4014. The memory nodes 4008 may be linked or pinned to virtual memory nodes or vNodes 4016. When the memory node 4008 is linked or pinned to a corresponding vNode 4016, then data may be mapped directly from the memory nodes 4008 to their corresponding vNodes 4016.

All the various components shown in host machine 4002 may be connected with and to each other or communicate to each other via a bus (not shown) or via other coupling or communication channels or mechanisms. The host machine 4002 may further include a video display, audio device or other peripherals 4018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 4020 (also referred to as disk drive unit), and a network interface device 4022. The host machine 4002 may further include a data encryption module (not shown) to encrypt data. The components provided in the host machine 4002 are those typically found in computer systems that may be suitable for use with aspects of the present disclosure and are intended to represent a broad category of such computer components that are known in the art. Thus, the system 4000 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 4024 also may be a Solid-state Drive (SSD), a hard disk drive (HDD) or other includes a computer or machine-readable medium on which is stored one or more sets of instructions and data structures (e.g., data/instructions 4026) embodying or utilizing any one or more of the methodologies or functions described herein. The data/instructions 4026 also may reside, completely or at least partially, within the main memory node 4008 and/or within the processor(s) 4006 during execution thereof by the host machine 4002. The data/instructions 4026 may further be transmitted or received over a network 4028 via the network interface device 4022 utilizing any one of several well-known transfer protocols (e.g., Hyper Text Transfer Protocol (HTTP)).

The processor(s) 4006 and memory nodes 4008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 4002 and that causes the host machine 4002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 4030 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 4002, with each server 4030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the method according to various aspects of the present disclosure are provided below in the following numbered clauses. An aspect of the method may include any one or more than one, and any combination of, the numbered clauses described below.

FIG. 6 illustrates a flow chart of one aspect of a method 600 to automatically extract indexing fields from a digital data record, according to at least one aspect of the present disclosure. Method 600 may include receiving 605 a digital data record such as an SDS. The document may be received in any format, including an image format such as a PDF or PNG document. Method 600 continues to converting 610 the data or contents in the digital data record into a text format. This is not a simple conversion, but rather is a strategic conversion, aimed to maximize the efficiency of the ultimate pipeline. For example a document can first be checked to determine whether it is an SDS by using rule based approaches using section headers and label headers it contains. Then if the document is determined to be an SDS, a predetermined number of pages and/or pages with specific locations in the document (for example the first two pages of the document are checked for specific field(s)), in other embodiments, the first two and last two pages, can be checked for some fields, or for composition section(s) of content field(s). This maximizes the efficiency because only some pages and fields are then converted. Different variations of these texts may be created for each field for maximum accuracy. Once the document is converted to a text format, preprocessing 615 is undertaken on the converted text to make it easier for machine learning models to extract specific information that's required. Various rules can be implemented to deal with the inconsistencies in SDS formats and templates, and the use-case specific rules which involve differences in the manner text appear on SDS vs text to be indexed.

Various fields and types of contents can be extracted, identified and indexed by method 600, these may include for example names, identifiers, types, dates, codes, aliases and the like. In preferred embodiments, where SDS documents are geared towards chemical enterprises a list of fields to be indexed could include product name(s), product code(s), manufacturer name(s), supplier, revision date, CAS or other identifier codes for chemicals, aliases, languages, and regulatory formats or regions. In various embodiments, for at least one field, the pre-trained machine learning model is used to identify the content belonging to the specific field. Therefore, if there are six fields for example, in some embodiments six separate machine learning models are used where the text is fed into six separate models 620, where each machine learning model 620 is designed to identify and extract one type of content belonging to a specific field. In one example, these preprocessed versions of texts are then fed into a number of NLP machine learning models, for example six models for six fields, where potential index candidates are created. Example fields where a machine learning model is used to identify and extract content can include for example Product Name, Product Code, CAS, Alias, Manufacturer Name, and Supplier Name are the six fields that use machine learning models. These machine learning models are created and trained in a separate process by using vast quantities of SDSs that were historically indexed using human labor. In several aspects, for different field types, a separate process can be used, for example the process described in FIG. 1.

Each model 620 that is deployed as part of method 600 outputs identified and extracted content or text from its associated or specific field. These output(s) or candidate output(s) are then post-processed 625. At this stage each potential candidate again goes through additional scrutiny and checks to ensure the validity of these candidate outputs. Final inferences are then obtained for each field, out of these potential candidates. In addition, further post-processing can be done to match the raw model inferences with exact values to be seen, this could include simple presentation level changes (such as matching a case of a letter or punctuation back to what is on the document), or it could include complex changes may be matched such as a manufacturer name from SDS text to what is in the database (which may not be identical). Some of these changes involve simple changes like matching case, punctuation, etc., and some use-case specific changes like Manufacturer and Supplier nuances. Finally, indexes 630 can be produced which can then be displayed on a display screen or other display device.

FIG. 7 illustrates a flow diagram of one aspect of a method 700 to automatically extract indexing fields from a digital data record as well as extracting specialized information via a separate pipeline, according to at least one aspect of the present disclosure. Method 700 can be implemented on a digital data record 705, of various formats, for example an image format such as a PDF. A page selection module 710 may be run on digital data record 705, for example similar to page selection module 103 of FIG. 1. The page selection module 710 may be run or initiated multiple times on a digital data record 705, with each time it is run to identify pages related to a specific field or content type in the digital data record. Alternatively, the page selection module 710 may be run to identify various or multiple field or content types, and output the page number(s) for each of these types. Page selection module 710 takes the digital data record as input, for example in PDF format, and uses rule-based approaches to identify which page(s) within the SDS pages contains the information that is being sought, and returns or outputs page numbers. This step restricts the search to the pages containing the required information and improves the system's overall precision as discussed above to maximize the efficiency of the machine learning models utilized.

In some aspects, running page selection processes via the page selection module 710 is not necessary, for example when page numbers where text of target content or field types in the digital data record 705 are known. In these instances, the digital data record and known page numbers are directly input 715 into the text extraction module 720 to begin text extraction from the specified pages of digital data record 705.

Once pages are selected, for example by page selection module 710, then text is extracted from these pages, for example by a text extraction module 720. In several aspects, text is extracted from each page that is identified. The text extraction module 720 receives the output page numbers from the page selection module 710, along with the digital data record 705 in its original format as input, and extracts the text from the specified pages of the digital data record 705. The text extracted is passed on, for example as a long string, to a next module. Various and multiple versions or copies of text may be extracted, due to differences in page numbers returned, for each of the fields where information is being extracted from.

In several aspects, once text is extracted by text extraction module 720, then the text is pre-processed by an automated pre-processing module 725. These pre-processing algorithms are designed to produce text outputs that are more easily processed by the machine learning model to extract the specific information that's required. The pre-processing steps include, but are not limited to substitutions: for example some of the redundant information is substituted with blank string in the extracted text; specific information removal, for example contact info or address removal where any type of contact information such as email address, phone number, and website are removed from the text as they do not provide any useful context for detecting the standard indexing fields, removal of any kind of address, company headquarter information, and the like can also be removed; change extensions, for example some extensions or abbreviations in the company name are removed or abbreviated; finally other general text preprocessing that is required for any text-based tasks can also be undertaken.

Similar to the page selection module 710 and the text extraction module 720, the text preprocessing module 725 may also return or output multiple copies of processed or cleaned text, due to differences in processing rules and page numbers extracted, for each of the fields or content types being extracted. For each pre-determined field, or content type in the digital data record 705 that is preprocessed, the preprocessed text of that field is input 730 into a pre-trained machine learning model that is designed to accept inputs of preprocessed text and output 735 the content that belongs to that specific field type. For SDS documents, the field types can include and are not limited to CAS code(s), Manufacturer Name, Supplier Name, Product Name, Product Code, Alias, Revision Date, Language, and Regulatory Format. For each of these fields, the machine learning network has been pre-trained on mass quantities of documents in a supervised or unsupervised setting depending on the field or content type and the available training data.

The output 735 produced by each pre-trained machine learning model can include individual inferences for each field. Multiple outputs, or inferences may be produced or output 735 by each network, whereby some are relevant and others may not be. Verification and validation checks can also be applied to either select from candidate outputs or verify and validate the accuracy or relevance of these outputs. After all validation checks are passed, the indexes 740 (or model inferences) from each field are combined and returned and saved in the database. In several aspects, these indexes 740 may be displayed on a graphical user interface or in a list format for an end-user.

In several embodiments, one or more field types are determined separately to or with processes that are in parallel to the processes 720-735, via one or more other modules targeted towards differently formatted or different types of content in digital data record 705. For example, a certain code or number like a CAS code or number formatted in a manner that is too difficult to extract using the steps 720-735. In one example a CAS code, or chemical compositions or ingredients are extracted and identified by one or more modules 745. Modules 745 can comprise one or more processes 100-300 described in any of FIG. 1-3 for example.

FIG. 8 illustrates a method 800 of extracting and indexing content from a digital data record, according to at least one aspect of the present disclosure. In one aspect, the method 800 includes identifying 805, based on rules defining target information fields, for each target field of the target information fields, at least one page in a digital data record comprising content related to the target field. These target information fields may be pre-set or pre-determined for example based on rules for each type of digital data record 705 of FIG. 7. This could be carried out for example by page selection module 715 of FIG. 7. Once a page or page number if identified 805, then method 800 includes extracting, for each target field, from the identified at least one page, at least one portion of text comprising the content. This means that for example in a field of "product name."

The method 800 continues with extracting, 810, for each target field, from the identified at least one page, at least one portion of text comprising the content, which can be for example undertaken by a text extraction module 720 of FIG. 7. For each portion of text that is extracted for each target field, method 800 can continue to feeding 815 for each target field, a pre-processed version of the at least one portion of text into a ML model, wherein the ML model is trained on the target field. In several aspects, these portions of text that are extracted can be pre-processed and then fed 815 into the ML model.

In several aspects, the ML models that received the preprocessed text can then determine 820, for each target field, via the ML model trained on the target field, at least one candidate text comprising the content. Finally, for each target field, extract 825 the at least one candidate text. In several aspects, multiple candidate texts may be extracted 825, and then one or more multiple candidate texts can be chosen after validation or post-processing.

FIG. 9 illustrates one example of the inferences output by the methods disclosed herein to be combined and displayed, according to at least one aspect of the present disclosure. Inputs 905 are output as indexes 910, and may be displayed to a user in a graphical user interface.

FIG. 10 illustrates a flow chart of a method 1000 configured to generate and display various stressor ratings, according to aspects of the present disclosure. Method 1000 comprises first determining, selecting, recognizing or identifying 1010 new chemicals, stressors, or ingredients in an environment such as a workplace. In various aspects, 1010 is undertaken automatically by for example a change in a database or index detected by a processor, a computing device, a server, or other system or component such as apparatus 3000, or system 4000 described herein (these all can be referred to interchangeably herein as "system device"). In several aspects, a user input can add a new chemical, ingredient or stressor to a database that is then identified or recognized 1010 by the system device. Once a chemical is identified, recognized, or otherwise selected 1010 by a system device, application, or manually by user, then an algorithm, application, or module is executed to generate, provide, or determine 1020 a health effect rating ("HER") or multiple HERs that can be used or selected. An HER indicates the dangers or harm associated with the stressor.

In various aspects, a digital record is indexed whereupon a chemical is identified 1010 or results from the indexing, upon which a specific code such as a CAS Number/CAS RN, or a hazard code, or any other code or relevant data is then retrieved from at least one of the indexing results, a third party data source such as a CAS or hazard registry, open source publication or combinations thereof.

In several embodiments, where samples have been taken and sampling results are available for the stressor or chemical, these results may be stored in a database or otherwise available to the system device. These data samples/results and associated data is retrieved 1030, and an algorithm, application, or module is executed to generate, provide, or determine 1040 one or more of an exposure rating ("ER") and/or an uncertainty rating ("UR"). The ER is the level of exposure of an individual or of an environment to the stressor based on the available data sample results or data, while the UR is the level of scatter of the data or sampling results, i.e., how much sample results converge based on statistical analysis.

In various embodiments, a user can select 1050, via the interactive UI, or accept HER, UR, and ER suggested, provided or displayed by the interactive UI. Based on the user selection and/or acceptance (or otherwise modification or overriding to presented results) of any combination of the HER, ER, and UR, the method 1000 calculates 1060 based on the user interactions, a qualitative risk rating (also referred to herein as "RR", "risk rating", or "exposure risk rating") and an information gathering priority rating (referred to herein as "IGPR").

The RR is a holistic risk rating based on one or more of these aforementioned other ratings, for example it can in some aspects be based on the HER multiplied by the ER. While the IGPR is a rating that describes the importance of collecting additional samples or data for the stressor in question. In various embodiments, the RR is comprised of the HER multiplied by the exposure rating. In several embodiments, the IGPR is comprised of the RR multiplied by the UR.

FIGS. 11A, 11B, 11C, 11D, and 11E collectively illustrate a flow diagram of a method 11000 to generate various ratings for a stressor, in accordance with aspects of the present disclosure. The method 11000 can be undertaken by one or more applications running on one or more system devices. FIG. 11A illustrates a process 1100 of the method 11000, the process 1100 is one possible aspect to generate an HER. Process 1100 includes a materials library integration module 1101 configured to index a digital record or document 1110, for example relating to ingredient(s) or chemical (s), for example as described herein in FIGS. 1-9. This indexing 1122 takes as input a digital record, document, SDS containing information about a chemical, stressor or ingredient data, record, or SDS as described elsewhere in this document. In some aspects, this indexing is undertaken 1130 via one or more ML models, or by a programmed algorithm relying on manual indexing using a Materials Library.

Once indexing 1130 is completed, a list of indexed information, ingredients, chemicals, or stressors is produced 1140, which can then be accessed by other components or applications, such as specialized industrial hygiene (IH) applications that retrieve or direct the retrieval of specific ingredient, chemicals, or associated codes from the results 1140 of the indexed document. An application may also identify, select, or indicate 1140 which results from the indexed digital record or document are of relevance. In one embodiment, a user may select 1160 a stressor, chemical or other data variable for qualitative exposure assessment (QEA), or this selection 1160 can occur automatically based on pre-selected, identified or detected stressor, for example by an automated stressor detection system or by the IH application 1150 that determines which stressors or chemicals are of relevance or of importance. The stressor that is of relevance thus can be automatically selected 1160 for further assessment. In several aspects, the process 1100 may also include retrieval of a code or CAS No. from a third data source such as open-source resources or publications such as a web feed or other publication.

In various aspects, a digital record is indexed whereupon a chemical is identified or results from the indexing, upon which a specific code such as a CAS Number/CAS RN, or a hazard code, or any other code or relevant data is then retrieved from at least one of the indexing results, a third party data source such as a CAS or hazard registry, open source publication or combinations thereof. The code that is required for the process 1100 can be designated or set by a user via an interactive UI, or by the IH application 1150.

FIG. 11B illustrates a continuation of the process 1100 of the method 11000 as illustrated in FIG. 11A. Upon the selecting 1160 in FIG. 11A, the process 1100 continues to run a module 1170 which first determines whether health effect data/a GHS classification is available in association to the stressor or chemical that was selected 1160. In several embodiments, once a stressor is selected 1160 whether automatically or manually, the process 1100 continues to, for each identified code or CAS No., retrieve information or reach out to a repository to retrieve an associated code- which can be from different libraries that publish data, this code can then be used in the steps described in 1171-1175. If it is determined 1171 that health effect information, a CAS No, an associated code, or a Globally Harmonized System of Classification and Labelling of Chemicals ("GHS") classification is not available from either the indexing that occurred or from another data source, then human intervention is needed to either input that information or change the selection 1160 of the stressor. If it is determined 1171 that health effect data or GHS classification information is available, then process 1100 proceeds to determining 1172 of the presence of a first set of identifiers, data, tags or information (referred to collectively herein as "chemical data"), as non-limiting examples can include "carcinogen 1A/1B", "mutagen 1A/1B", "Reproductive 1A/1B", "Acute tox 1", "Acute tox 2", "Respiratory sensitizer 1/1A", "STOTT-SE 1", "STOTT-SE 2" and other possibilities not listed herein. If it is determined 1172 that one or more of the chemical data is present, then a first HER score can be provided or assigned to the stressor, for example a score of '4', if none of these is present, then process 1100 proceeds to another determination 1173.

Determination 1173 can comprise determination of the presence of any of a second set of chemical data that are present in association with the selected stressor that can include and are not limited to "carcinogen 2", "mutagen 2", "reproductive 2", "Actute tox 2", "Acute tox 3", "Respiratory sensitizer 1B", "skin sensitizer 1/1A", "Aspiration 1", "Skin Corrosive 1/1A/1B/1C"; "Eye damage 1", "STOT-SE 1", "STOT-SE 2", "STOT-RE 1", "STOT-RE 2", if any of the second set of chemical data is present, then an HER can be assigned to the stressor/chemical, for example an HER of 3.

Subsequently, a determination 1174 is undertaken if no HER was assigned in determinations 1172-1173, to determine whether any of a third set of chemical data is present in association with the relevant stressor, for example and not limited to "Acute tox 3", "Acute tox 4", "Skin sensitizer 1B", "Skin irritation 2", "Eye irritation 2/2A/2B", "STOT-SE 2", "STOT-SE 3", STOT-RE-2", or "Aspiration 2". If it is determined 1174 that one or more of the third set of chemical data is present, then a third HER score can be provided or assigned to the stressor, for example an HER of '2', if none of these is present, then process 1100 proceeds to another determination 1175.

A determination 1175 is undertaken if no HER was assigned in determinations 1171-1174. Determination 1175 determines whether any of a fourth set of chemical data is present in association with the relevant stressor. For example and not limited to "Acute tox 4", "Acute tox 5", "Skin irritation 3", "STOT-SE 3", "Asphyxiant gas". If it is determined 1175 that one or more of the fourth set of chemical data is present, then a fourth HER score can be process or assigned to the stressor, for example an HER of '1', if none of these is present, then component 1100 assigns a 'no health hazard' HER for example an HER of '0' or '1'. The steps of 1171-1175 determine and assign a final HER 1180.

FIG. 11C illustrates a process 1110 of method 11000 to generate a UR 1191. In one embodiment, a similar exposure group (SEG) matrix 1181 can be utilized to automatically identify 1182 one or more stressors. For example, an SEG matrix may be generated based on the HER (e.g., HER 1180 of FIG. 11B), an exposure rating, or both. The stressors of concern that are based on this SEG matrix are identified 1182 automatically, and out of these stressors, stressors to monitor are selected 1183. Based on sampling data of samples that have been previously taken, options for selection are provided and displayed via the user interface for a user to select 1184 a specific stressor to rate or consider. According to one embodiment, the sampling data may be processed, such that concentration or time-weighted average results may be used. Further, censored data rules may be applied and scope dates of the data may be set as well.

Process 1110 of method 11000 also include a determination 1185 of whether there are a sufficient number of data samples for the selected 1184 stressor, where "sufficient" can be defined by a number of samples above a minimum number of samples, or that meets or exceeds a threshold number of samples (which can be set automatically by the application(s) executing at least a portion of method 11000 or manually by a user). A statistical calculation may be undertaken 1187 when there is a sufficient number of samples, for example and not limited to calculating the standard deviation (SD) of the data samples. Upon undertaking a statistical calculation 1187, process 1100 determines whether there is sufficient data at least based on the statistical calculation 1187 and/or other factors, such as the number of data samples or other configurable and customizable thresholds or metrics. For example, if it is determined 1188 that SD<3, then a rating of certainty is assigned 1189 to the data sample or stressor. If it is determined 1188 that SD≥3, then a rating of uncertainty is assigned 1190 to the data sample or stressor. On the other hand, if it is determined 1185 that there are insufficient number of samples or a threshold number of samples, then a rating of high uncertainty is assigned 1186 to the stressor and/or collection of data samples. The ratings assigned in 1186, 1189, or in 1190 can individually or in combination be used to generate 1191 a UR.

FIG. 11D illustrates a process 1124 which includes using an SEG matrix 1191 to automatically identify 1192 one or more stressors. In various aspects, an SEG matrix 1191 is generated based on the HER (e.g., HER 1180 of FIG. 11B), an exposure rating or both. The stressors of concern are identified 1192 automatically based on this SEG matrix, and out of these stressors, automatically selecting these 1193 stressors to monitor. In several aspects, data and information from materials library 1194 may be obtained to improve mapping of stressors to identify 1192 and automatically assigning 1193 stressors for monitoring. This information is used in the identifying 1192 of stressors and assigning 1193 of stressors to monitor. A user may select 1195 a stressor from those automatically identified and assigned for monitoring 1192-1193 and which are now automatically presented as options for selection to the user via the interactive UI for the stressor to be assigned a rating such as but not limited to an ER.

For each stressor selected 1195 by the user of the interactive UI, the process 1124 includes a determining 1197 of whether a baseline of number of samples is met, if not then an actionable alert or notification can be generated 1198 and displayed to the user via the interactive UI and optionally, an area or option to input additional sample data can be provided/displayed on the interactive UI such as via a pop up screen, where the user can browse and upload documents, or via a data entry screen with an assigned data entry and input space. However, if it is determined 1197 that the baseline or threshold number of data samples for the stressor are sufficient or a baseline/threshold has been met, then a statistical calculation or analysis is undertaken 1196, for example, one that may include a calculation 1196 of a SD and/or of average(s) of the sample data. Furthermore, after the calculation 1196, a determination 1801 can be undertaken by the process 1124 as to whether there is sufficient data/data samples based on the calculation 1196. If it is determined 1801 that there are insufficient data samples, then an actionable notification 1800 may be provided and/or displayed 1198 via the interactive user interface to add additional sample data. Additional sample data can be input 1199 by a user manually or by uploading data results or digital documents for example, to the initial sample results/data in the system. There could also be an option that is selectable or activatable to trigger collection 1800 of additional data by the system, for example from internal or external data sources, databases or other information nodes. If it is determined 1801 that there is sufficient data, then process 1124 initiates 1802 an algorithm which can include calculating 1803 a geometric mean of the data samples, and then calculating 1804 an ER based on the data samples and or specific rule based algorithms. Upon the calculation 1804, an ER for the stressor is generated 1805.

FIG. 11E combines the various processes in FIGS. 11A-11D. In several aspects, the UR 1191, HER 1180, and ER 1805 may be used to generate 1810 a risk rating ("RR") and/or an information gathering priority rating ("IGPR"). In several aspects, the calculations for the RR and IGPR are those described in relation to FIG. 10, but other calculations are possible. The RR and IGPR can be generated or displayed as part of an interactive UI in various forms for, e.g., further optimization of sampling data 1811 by the system of the present disclosure, such as drop down menus, selectable ratings, as part of information displayed related to specific stressors, roles and the like.

FIGS. 12A, 12B and 12C collectively illustrate a flow diagram of another method 13000 configured to generate various ratings for a stressor, according to at least one aspect of the present disclosure. In several aspects, method 13000 is comprised of three primary phases 1300, 1301, and 1302. Phase one 1300 relates to deriving an HER rating and providing it via an application or microservice, for one or more ingredients. Phase two 1301 relates to making available or providing ingredient/stressor information along with HER information in IH applications. Phase three 1302 relates to generating and providing ER and UR for an industrial hygiene exposure assessment.

Phase one 1300, as shown in FIG. 12A, can comprise indexing 1303 the chemicals in one or more products for example from one or more digital records or documents. Indexing is described elsewhere in this document. Indexing can occur in or with information from a chemical management application and via machine learning. As a result of this indexing, CAS numbers may be retrieved for the ingredients. This CAS number may be used to fetch GHS hazard classification data from a third-party database.

For the one or more ingredients/stressors indexed or identified 1303, an HER is calculated or generated 1304 based on an algorithm by running the CAS number against the GHS classification hazard category to determine the HER, as described above with respect to the module 1170 of FIG. 11B.

In several aspects, once the HER is calculated for the ingredient, and various HERs are calculated or generated 1326 for each indexed stressor/ingredient, that data will be extrapolated to calculate a "product level HER." As a non-limiting example, selecting the highest ingredient HER and/or assigning 1327 it to the product/ingredient. In several aspects, one of or both the ingredient HER and product HER will be shown on the UI. For example, the HER may be provided in one or more applications via one or more interactive UIs. The HER data can be utilized for various purposes. For example, HER data can be used to determine whether industrial hygiene monitoring is required on the ingredient, stressor, or the product. In some aspects, HER meeting one or more specific thresholds trigger different processes. For example, a process for Job Safety Analysis, Control of Work activities etc. may be based on a selected threshold being met.

FIG. 12B illustrates one aspect of phase two 1301 of method 13000. Various portions of phase two 1301 correspond with the processes of phase one 1300. Phase two 1301 can comprise indexing identifiers/stressors or ingredients from a digital record, document or SDS, and then from those ingredients/stressors identified from the indexing 1317, calculating or generating 1318 an HER for example in a manner corresponding to phase one 1302. The stressor, product or ingredient information can be sent 1319 to a chemical materials library or database, and/or sent 1320 to an IH application or database, for storage or otherwise, in some aspects only when the HER is above a certain threshold or predetermined rating. According to an embodiment, if the HER for a product is greater than 1, information relating to the product, product ingredients and HER will be transmitted to the IH application. It is important to maintain the product and ingredient information even if the product is not currently in use. Further, location based permissions may be applied to restrict access to product and ingredient list.

FIG. 12C illustrates a continuation of phase two 1301 of method 13000, wherein after the HER information is sent 1320 to an IH application or database, the application or database maintains 1321 a master stressor list, wherein the master stressor list, can include other accompanying or complementary information from external or public sources such as rules or regulations or occupational exposure limits set by organizations such as ACGIH and OSHA. In several software applications, a customer can only monitor stressors that are present in this master stressor list. Additional stressors can be added, as needed. For example, a customer can request data on a stressor to be added to the master list, the request resulting in a notification 1322 to the administrator of the IH application to automatically pull new data or update data 1323, or otherwise to manually add 1323 the data to the master list.

In several aspects, a customer-side application interactive UI allows a customer to use the IH application to map the stressors they want to monitor or utilize to their client-side account before they can use it for any IH activities. This in several aspects can correspond to selecting a stressors from the master stressor list to a customer/client-account specific list. Once a customer selects a specific stressor, method 1301 can include determining 1324 whether the stressor is mapped from the master list in the database or a server side system/backend to the customer account or list. If it is determined 1324 that the stressor is not mapped to the customer's list or account, then the stressor is automatically mapped 1325 from the database to the customer account. If it is determined 1324 that the stressor is already mapped to a customer-side list or account or after this has been mapped 1325, the stressor can be displayed 1327 for selection from one or more stressor or ingredient lists or dropdowns on an interactive UI. For example, if a product is chosen, the stressor drop down list may be narrowed down to the ingredients of the product selected. Relevant industrial hygiene program of the company will be managed 1331 accordingly.

In some embodiments, clients may use their client-side interactive UI to conduct or perform a Qualitative Exposure Assessment (QEA), upon which they will be offered the HER rating derived earlier in method 13000. The QEA calculates the exposure RR and IGPR. For example, the Exposure RR=Health Effect RatingxExposure Rating, and/or IGPR=Exposure Risk Ratingx Uncertainty Rating.

If the HER info is available 1326 and other product and ingredient information is available 1329, then a QEA is performed 1330. In several aspects, ER and UR can only be calculated automatically if there are previous monitoring samples available in the application or sample data stored in the database. In one embodiment, the system may set a default number (e.g., 5 sample results or any user defined number) for the required number of sample results needed for determining the ER. For example, the interactive UI/application may provide the customer the option to set up the required number or minimum sample results needed in order for the application/system to calculate or generate ER or any other team needing sample results or data. This can include application or a system wide setting(s) that will apply to all QEA calculations. The customer will have the option to set up how many sample results they want to have before the system can perform an ER calculation. In some aspects, if the baseline number of samples requirements is not met, calculation cannot be performed, and the customer will be notified.

FIG. 12D illustrates one aspect of a third phase 1302 of method 13000. As discussed in relation to FIG. 12C, a customer may initiate 1332 a QEA for a specific stressor via the interactive UI of an industrial hygiene application. The system or application then looks up 1333 the stressor and SEG, and if it determines that data is available in the database, it pulls 1334 sample results from the database for the identified 1333 or otherwise corresponding stressor and/or SEG. The application or system then determines 1335 if the baseline number of sample results as set by the customer or otherwise is met. According to one embodiment, the sampling data may be processed, such that concentration or time-weighted average results may be used. Further, censored data rules may be applied and scope dates of the data may be set as well. As discussed earlier if it is determined 1336 that the baseline of data samples required has not been met then the client may be notified 1337 through the application and/or automatically add 1338 the required number of data samples to a sampling plan of the application that may include retrieving sampling data automatically from various sources, such as publicly available from published data sources, or internal sources from the client until the requisite number of data samples are achieved.

If it is determined 1339 that the baseline has been met, then the system, application or method 13000 will check for the quality of data by calculating 1340 a SD of the data. If it is determined 1341 that the SD is less than a threshold, for example '3', then the sample result data is considered sufficient and the system will proceed to execute 1343 an algorithm, for example in one aspect, execute 1343 an algorithm to calculate the ER, otherwise the method 13000 will revert to notifying the customer and/or collecting 1342 additional sample data similar to what was described earlier in relation to 1336-1338.

The algorithm executed or initiated 1343 can be an algorithm to calculate an exposure rating by calculating 1344 the geometric mean and using that geometric mean and compare 1345 it with threshold values or pre-defined categories in the program or database to determine 1346 the exposure rating or another rating. The algorithm executed 1343 can comprise in one example taking all data samples, or monitoring results (n results) for the particular stressor for the selected SEG and multiplying them together. Thereafter, the algorithm may take the $n^{th}$ root of the answer, such that the system has results or data samples of 1.0, 1.1, 1.1, 1.0, 1.0, 1.05 (n=6) for a designated stressor in a particular SEG. These numbers are multiplied together for a product of 1.27. Next, the $6^{th}$ root of 1.27 is taken: 1.04=Geometric Mean. This number is then compared to the occupational exposure limit (OEL) by calculating what % of the OEL it is. For example, if the OEL=2, the % OEL is 52%. Subsequently, the calculated % OEL is compared to the ER ranges in the software and determines what the ER value is. In this case, ER=3 because the GM of 1.04 is 52% of the OEL.

FIG. 12E illustrates another section of the third phase 1302 of method 13000 to calculate the UR. Calculating the Uncertainty Rating is very similar to the health effect rating as described elsewhere in this document. The system may first determine 1351 whether the requisite amount of samples or data 1350 is available, for example in a database, or provided by the customer. If it is determined that there is not a sufficient level of data samples, then a specific rating is assigned 1353 as "highly uncertain," which for example could be a UR of '2'. If it is determined that the requisite number of data samples is available, then it will calculate 1355 the SD of the available sample results. If the sample results has a SD less than a threshold (e.g., SD<3), then a "certain" rating may be assigned 1358. If the SD calculated is over a selected threshold, e.g., '3', then a "uncertain" rating is assigned 1357. The assigned 1353, 1357, and 1358 determine the final uncertainty rating assigned 1359.

The ER and UR calculated can be used by the program or software to generate RR and IGPR to create a recommended industrial hygiene sampling plan for each of the customer's facilities. Currently, annual sampling plan development is a manual and time-consuming process that oftentimes is not based on risk, and results in over-sampling for stressors at a facility. Using the system-generated sampling plan adds additional risk-based process efficiencies for customers, as well as reduce consultant and analytical laboratory costs associated with IH exposure monitoring.

FIG. 13 illustrates one example of an interactive qualitative assessment in an interactive user interface ("interactive UI") for generating, displaying and interacting with various stressor ratings, according to at least one aspect of the present disclosure. The interactive UI 1400 can include a selection panel 1401 that includes various selectable options, these options may be set out in a table with column/row formatting, or in any other format, and can include departments, jobs, tasks, associated tools or equipment, and a listing of stressor(s) associated with these. A user can select a row or option in selection panel 1401 which is then expanded or displayed in a display panel 1402 with some or all its data which may be customizable by the user. For example, a user can set custom exposure ratings, HERs, or URs manually and/or override any suggested, displayed, or already calculated ratings provided by the system or by method 11000 or 12000. The interactive UI's 1400 display panel 1402 can comprise drop down menus or selectors 1404-1406 comprising any of an ER selector 1406, an HER selector 1404, or a UR selector 1405, or combinations thereof. The values available for selection may be set and provided based on the rating generation processes described above. The interactive UI 1400 can also include a navigation bar 1403 that can navigate the user to various other areas in the interactive UI 1400, these can include tabs for SEGs, qualitative assessments, sampling plans, medical surveillance, surveys, samples, lab submissions, industrial hygiene equipment, fit tests, reports and other possible configurable tabs and options.

FIG. 14 illustrates one example of an interactive table of various assessed stressor ratings, according to at least one aspect of the present disclosure. Interactive UI 1500 includes a set selection panel 1504 that may include a search function/bar and/or various drop down menus or selectable options to set and customize any of the rows, columns or interactive and/or displayed information in a selection panel 1501. The set selection panel 1504 can include for example drop down bars or set functions to select and/or set the department, job, tasks, associated equipment, stressor, the next assessment due, status and risk bands that will be displayed in selection panel 1501. The interactive user interface 1500 can also include a navigation bar 1503.

FIG. 15 illustrates one example 1600 of an interactive SEG matrix panel 1602 of the interactive UI, according to at least one aspect of the present disclosure. The SEG matrix/SEG matrix panel 1602 can be housed in the Qualitative Assessment module of an industrial hygiene application or software program. The SEG matrix may provide a high-level view of all qualitative assessments for the facility and/or in several aspects can be generated by clicking on a button on the interactive UI, that for example is titled "Display SEG Matrix," located above a table 1610 that includes all of the site's qualitative assessments. From that table 1610, the software counts the number of qualitative assessments of a stressor that are in the same risk band, and enters that number in the appropriate SEG Matrix box. Once generated, the SEG Matrix can be located above the table 1610 containing all of the sites qualitative assessments. The user can interact with the matrix by clicking on the hyperlinks for each number in the matrix that is >1, and the software will then show the tabular detail of the qualitative assessments that have that particular RR and are in the same Risk Band. The user uses this information to determine which stressors to add to the annual sampling plan, and also to communicate a clear risk message to management.

In one aspect, the SEG matrix 1602 may include an ER on one axis and an HER on the other axis, and can be associated to a stressor that is related to a selection on the selection panel 1401 of FIG. 13. The SEG matrix 1602 sets out in various colors, for example red, yellow and green or any other combination of colors, the various groupings between the stressors or selections displayed on the interactive UI 1600. For example, a stressor (that can be related to a selected row in the selection panel 1401 of FIG. 13) with an HER of 4 and ER of 1 placing it in a green zone and giving it a RR of 0. A user may interact with the SEG matrix 1602 by clicking each entry on the matrix which can lead the user to further information about the stressor. In another example, a stressor (that can be related to a selected row in the selection panel 1401 of FIG. 13) with an HER of 3 and an ER of 4 places it in a yellow zone with a total RR of 2. A third example may include a stressor (that can be related to a selected row in the selection panel 1401 of FIG. 13) with an HER of 1 and ER of 1 places it in a green zone with an RR of 1.

FIG. 16 illustrates one example of interactive sampling and sampling plans of the interactive UI, according to at least one aspect of the present disclosure. The Interactive UI 1700 may include a sampling plan panel 1701 which allows the creation of data sampling plans for each stressor, or role, environment, department, or area related to a stressor or potential stressor. The interactive UI 1700 can also include a set selection panel 1701. The interactive UI 1700 can also include the navigation bar 1703 that corresponds with navigation bars, 1403, 1503 of FIGS. 13-14.

FIG. 17 illustrates one example of interactive sampling of the interactive UI, according to at least one aspect of the present disclosure. The interactive UI 1800 can include a selection panel 1801 that corresponds with selection panel 1401 of FIG. 13 for example. The interactive UI 1800 can also include the navigation bar 1803 that corresponds with navigation bars 1403 of FIG. 13 for example. The interactive UI 1800 can also include a customization panel 1802 that can customize the details and data displayed in the options in the selection panel 1801, whether via selections from drop down menus or via data entries.

FIG. 18 illustrates another example of interactive sampling of the interactive UI, according to at least one aspect of the present disclosure. The interactive UI 1900 can include a selection panel 1901. The interactive UI 1900 can also include the navigation bar 1903 that corresponds with navigation bars 1403 of FIG. 13. The interactive UI 1900 can also include a customization panel 1902 that can customize the details and data displayed in the options in the selection panel 1901, whether via selections from drop down menus or via data entries, including details in various rows or columns in the selection panel 1901, and for example, information about a department, task, job, associated equipment and the like.

According to aspects of the present disclosure, FIG. 19 illustrates a flowchart of a computer implemented method 2000 for automated industrial hygiene risk assessment and display. Method 2000 may comprise receiving (2002) sampling results for a stressor in a physical environment; deriving (2004) one or more codes for the stressor from at least one of a digital record via an indexing module, chemical management application or database or a third party data source; generating (2006) a health effect rating (HER) based on the one or more codes; generating (2008) an exposure rating (ER) based on the sampling results; generating (2010) an uncertainty rating (UR) based on the sampling results; displaying (2012) via a display device, an interactive user interface to facilitate approval or selection of at least one of the HER, the exposure rating, or the uncertainty rating; generating (2014) at least one of a risk rating (RR) or an information gathering priority rating (IGPR) based on a selection of the at least one of the HER, the ER, or the UR; and displaying (2016) via the interactive user interface at least one of the RR or the IGPR.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment or aspect, but other elements may be added and still form a construct within the scope of a claim. In contrast, the transitional phrase "consisting of" excludes any element, step, or ingredient not specified in a claim. This is consistent with the use of the term throughout the specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. A computer implemented method for automated industrial hygiene risk assessment and display, the method comprising:
   receiving sampling results for a stressor in a physical environment;
   deriving one or more codes for the stressor from at least one of a digital record via an indexing module, chemical management application or database or a third party data source;
   generating a health effect rating (HER) based on the one or more codes;
   generating an exposure rating (ER) based on the sampling results;
   generating an uncertainty rating (UR) based on the sampling results;
   displaying via a display device, an interactive user interface to facilitate approval or selection of at least one of the HER, the exposure rating, or the uncertainty rating;
   generating at least one of a risk rating (RR) or an information gathering priority rating (IGPR) based on a selection of the at least one of the HER, the ER, or the UR; and
   displaying via the interactive user interface at least one of the RR or the IGPR.

2. The method of claim 1, wherein the deriving of the one or more codes via the indexing module comprises:
   inputting an image of a page of the digital record into a visual machine learning network (visual ML), wherein the visual ML is trained to recognize, in the image, text associated with targeted information;
   identifying by the visual ML, a section of the image that contains the targeted information;
   inputting a page number of the page, the digital record, and coordinates of the section into an extraction module; and
   extracting the one or more codes by the extraction module from the section.

3. The method of claim 2, further comprising:
   selecting a page number of a digital document of digital records to identify a page containing the one or more codes,
   wherein the selecting comprises at least one of:
      parsing the digital document to produce a string of characters; and
      identifying relevant portions in the string of characters containing the one or more codes.

4. The method of claim 3, wherein the identifying of the relevant portions comprises:
   splitting the string of characters into tokens;
   inputting the tokens into a natural language processing ML network (NLP); and
   identifying by the NLP a first word of a chemical ingredient name, a subsequent word of a chemical ingredient name, or a word not belonging to any chemical ingredient name.

5. The method of claim 3, wherein the identifying of the relevant portions comprises at least one of:
   adding the page number to a list, based on determining a beginning part and an end part of a relevant portion are on the page,
   adding the page number to a list, based on determining that the beginning part but not the end part of the relevant portion is on the page, and that the targeted information is on a subsequent page,
   adding the page number to a list, based on determining that the end part but not the beginning part of the relevant portion is on the page, and that the targeted information is on a previous page, or
   adding the page number to a list, based on determining that an alphanumeric combination is present on a page.

6. The method of claim 2, wherein the visual ML is trained on a custom dataset comprising images of digital documents to output coordinates of identified tables in the digital document.

7. The method of claim 2, further comprising:
   identifying the section via optical character recognition, based on the visual ML failing to identify the section; and
   outputting coordinates of the section of the image.

8. The method of claim 2, further comprising generating the image of the page corresponding to the page number.

9. The method of claim 1, wherein the risk rating comprises the ER multiplied by the HER.

10. The method of claim 1, wherein the UR is a multiplier.

11. The method of claim 1, wherein the IGPR comprises the RR multiplied by the UR.

12. The method of claim 1, wherein the generating of the HER comprises classifying the one or more codes within a group of a plurality of groups, wherein each group of the plurality of groups is associated with a specific HER rating, the classifying generating the HER.

13. The method of claim 12, wherein the classifying is based on the one or more codes being associated with one or more chemicals.

14. The method of claim 1, wherein the user interface comprises interactive elements comprising at least one of a plurality of selectable tabs, a color coded SEG matrix, selectable menus to set the HER, ER and UR of the stressor, or selectable or clickable options to rearrange displayed information.

15. The method of claim 1, wherein the interactive user interface comprises interactivity to select at least one type of data object to customize at least one of the HER, UR, or RR, or combinations thereof associated with the at least one type of data object.

16. An interactive interface system for display and interaction with automated industrial hygiene risk assessments, the system comprising:
   at least one processor; and
   at least one non-transitory, computer-readable memory storing instructions that, when executed by the at least one processor, are configured to:
      receive sampling results of a stressor in a physical environment;
      derive one or more codes for the stressor from at least one of a digital record via an indexing module or a third party data source;
      generate a health effect rating (HER) based on the code;

generate an exposure rating (ER) based on the sampling results;

generate an uncertainty rating (UR) based on the sampling results;

display via a display device, an interactive user interface to facilitate approval or selection of at least one of the HER, the exposure rating, or the uncertainty rating;

generate at least one of a risk rating (RR) or an information gathering priority rating (IGPR) based on a selection of the at least one of the HER, the ER, or the UR; and display via the interactive user interface at least one of the RR or the IGPR.

17. The system of claim 16, wherein the instructions when executed by the at least one processor, are further configured to:

input an image of a page of a digital record into a visual machine learning network (visual ML), wherein the visual ML is trained to recognize text associated with targeted information in the image;

identify by the visual ML, sections of the image that contain the targeted information;

input a page number of the page, the digital record, and coordinates of the sections into an extraction module;

extract the targeted information by the extraction module from the sections;

input the extracted targeted information into a natural language processing ML network (NLP); and identify at least one data item, by the NLP, based on a structure of the extracted targeted information.

18. A non-transitory computer-readable storage medium, having embodied thereon a program, the program being executable by a processor to perform a method for displaying and interacting with automated industrial hygiene risk assessments comprising:

receiving sampling results of a stressor in a physical environment;

deriving one or more codes for the stressor from at least one of a digital record via an indexing module or a third party data source;

generating a health effect rating (HER) based on the one or more codes;

generating an exposure rating (ER) based on the sampling results;

generating an uncertainty rating (UR) based on the sampling results;

displaying via a display device, an interactive user interface to facilitate approval or selection of at least one of the HER, the exposure rating, or the uncertainty rating; and generating at least one of a risk rating (RR) or an information gathering priority rating (IGPR) based on at least one of the HER, the ER, or the UR; and displaying via the interactive user interface at least one of the RR or the IGPR, wherein the user interface comprises interactive elements comprising at least one of a plurality of selectable tabs, a color coded SEG matrix, selectable menus to set the HER, ER and UR of the stressor, or selectable or clickable options to rearrange displayed information, wherein the user interface comprises interactivity to select at least one type of data object to customize at least one of the HER, UR, or RR, or combinations thereof associated with the at least one type of data object.

19. The non-transitory computer-readable storage medium of claim 18, wherein the deriving of the one or more codes via the indexing module comprises:

inputting an image of a page of a digital record into a visual machine learning network (visual ML), wherein the visual ML is trained to recognize text associated with targeted information in the image;

identifying by the visual ML, a section of the image that contains the targeted information;

inputting a page number of the page, the digital record, and coordinates of the section into an extraction module; and extracting the one or more codes by the extraction module from the section.

20. The non-transitory computer-readable storage medium of claim 18, wherein the method for displaying and interacting with automated industrial hygiene risk assessments further comprises:

selecting a page number of a digital document of digital records to identify a page containing the one or more codes, wherein the selecting comprises at least one of:

parsing the digital document to produce a string of characters; and identifying relevant portions in the string of characters containing the one or more codes, wherein the identifying of the relevant portions comprises:

splitting the string of characters into tokens;

inputting the tokens into a natural language processing ML network (NLP); and identifying by the NLP a first word of a chemical ingredient name, a subsequent word of a chemical ingredient name, or a word not belonging to any chemical ingredient name.

21. The non-transitory computer-readable storage medium of claim 18, wherein the method for displaying and interacting with automated industrial hygiene risk assessments further comprises:

classifying the one or more codes within a group of a plurality of groups, wherein each group of the plurality of groups is associated with a specific HER rating, the classifying generating the HER, wherein the risk rating comprises the ER multiplied by the HER, wherein the classifying is based on the one or more codes being associated with one or more chemicals.

* * * * *